United States Patent  (10) Patent No.: US 11,593,034 B2
Stotski et al.  (45) Date of Patent: Feb. 28, 2023

(54) SIMULATING STRETCHED VOLUME REMOTE INSTANCE USING A SHADOW VOLUME ON A LOCAL SYSTEM

(71) Applicant: Dell Products L.P., Hopkinton, MA (US)

(72) Inventors: Yuri Stotski, Saint Petersburg (RU); Kirill Zabelin, Leningradskaya (RU); Chen Reichbach, Tel Aviv (IL); Yuval Harduf, Yahud (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/533,521

(22) Filed: Nov. 23, 2021

(65) Prior Publication Data
US 2022/0334775 A1  Oct. 20, 2022

(30) Foreign Application Priority Data
Apr. 19, 2021 (RU) .......................... RU2021110856

(51) Int. Cl.
G06F 3/06 (2006.01)
(52) U.S. Cl.
CPC ............ G06F 3/0665 (2013.01); G06F 3/065 (2013.01); G06F 3/067 (2013.01); G06F 3/0613 (2013.01); G06F 3/0635 (2013.01); G06F 3/0659 (2013.01)

(58) Field of Classification Search
CPC .... G06F 3/0665; G06F 3/0613; G06F 3/0635; G06F 3/065; G06F 3/0659; G06F 3/067
See application file for complete search history.

(56) References Cited

U.S. PATENT DOCUMENTS

| 11,349,917 B2* | 5/2022 | Jennings | H04L 67/1095 |
| 2008/0021693 A1* | 1/2008 | Campbell | G06F 11/261 703/21 |
| 2010/0251267 A1* | 9/2010 | Zwisler | G06F 12/0868 711/E12.078 |

* cited by examiner

Primary Examiner — Eric Cardwell
(74) Attorney, Agent, or Firm — Muirhead and Saturnelli, LLC

(57) ABSTRACT

A simulated stretched volume may be configured from multiple volumes of a single data storage system. The volumes may be assigned unique identifiers. The volumes may be exposed to a host over paths from the single data storage system as the same volume having the same unique identifier. The single data storage system may include sets of target ports with each set simulating paths to a different data storage system. A management command may be received that is directed to the simulated stretched volume having the unique identifier. The management command may be received on a path from the host to a target port of the single data storage system. Servicing the management command may include the single data storage system simulating either the local or remote system depending on the set of target ports including the target port.

19 Claims, 15 Drawing Sheets

702 — Issue a command to create a volume or LUN that is a simulated stretched volume or LUN configured using a volume pair V1, V2. V1 may be a normal or regular volume exposed to the host. V2 may be configured as a shadow volume of V1. V2 may be a simulated remote instance of the stretched volume or LUN.

704 — Create a first record or entry in the MGT DB for V1 and a separate second record or entry in the MGT DB for V2. The first and second records contain the same information other than different LUN identifiers, such as different WWNs, uniquely used to identify different volume or LUN instances of the regular and shadow volumes. The first record represents the stretched volume MD on the local data storage system for V1, and the second record represents the stretched volume MD on the remote data storage system for V2. A regular or normal volume object represents V1 and the first record denoting, respectively, the stretched volume and its MD when the data storage system simulates the role of the local data storage system. A shadow volume object represents V2 and the second record denoting, respectively, the remote counterpart of the stretched volume and its MD when the data storage system simulates the role of the remote data storge system. The LUN ID, such as the WWN, of V2 may be configured based on specified rules of a defined conversion or mapping process that maps a first WWN1 of V1 to a second WWN2 of V2. In a similar manner, WWN1 of V1 may be determined from WWN2 of V2 based on specified rules of a defined conversion or mapping process that maps the second WWN2 of V2 to the first WWN1 of V1.

706 — The data storage system target ports over which the stretched volume is exposed are partitioned into two groups. The two groups may be non-overlapping having no intersection or common target ports in both groups. A first group 1 of the target ports, TPG1, may be associated with simulating the local data storage system and paths between the host and the local data storage system. If the host issues a management command to a target port in TPG1, the command is considered as a command to the local data storage system and is processed using the normal volume object. A second group 2 of the target ports, TPG2, may be associated with simulating the remote data storage system and paths between the host and the remote data storage system. If the host issues a management command to a target port in TPG2, the command is considered as a command to the remote data storage system and is processed using the shadow volume object.

→(B)→ The path is to a target port in TPG2.

720 — The data storage system simulates the remote data storage system. A UID switching logic or component is used to map the WWN1 or LUN ID of the regular volume to a corresponding WWN2 or LUN ID of its shadow volume. The second record of MD for the shadow volume is updated or otherwise used to service the management command.

722 — If the management command modifies or updates the shadow volume MD in the MGT DB, processing is performed to simulate replicating the management command to the local data storage system. With a stretched volume, a connection between the local and remote systems is used to transmit commands and data in order to synchronize volume MD. However, in simulation mode when simulating the stretched volume, the connection is configured from the data storage system to itself and may be characterized as a loop back. The UID switching logic or component is used to map the WWN2 or LUN ID of the shadow volume to the corresponding WWN1 or LUN ID of its regular volume. The first record of volume MD for the regular volume may be accordingly updated based on the management command.

724 — An acknowledgement or response may be returned to the host along with any requested information.

FIG. 10C

SIMULATING STRETCHED VOLUME REMOTE INSTANCE USING A SHADOW VOLUME ON A LOCAL SYSTEM

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing management commands comprising: creating a simulated stretched volume in a single data storage system, wherein the simulated stretched volume simulates a stretched volume configured from two or more volumes in two or more data storage systems with the two or more volumes exposed to a host as a same volume having a same first unique identifier over two or more paths from the two or more data storage systems, wherein the simulated stretched volume is configured from a plurality of volumes of the single data storage system and the plurality of volumes are assigned a plurality of unique identifiers associated with the simulated stretched volume, and wherein the plurality of volumes configured as the simulated stretched volume are exposed to the host over a plurality of paths from the single data storage system as the same volume having the same first unique identifier, wherein the single data storage system includes sets of target ports, wherein each of the sets of target ports simulates paths to a different one of the two or more data storage systems; receiving, on a first path of the plurality of paths, a first management command directed to the simulated stretched volume configured as the same volume having the first unique identifier, wherein the first path is from an initiator of the host to a first target port of the single data storage system, wherein the first target port is included in a first set of the plurality of sets of target ports and the first set of target ports simulates paths to a first data storage system of the two or more data storage systems; and performing first processing to service the first management command, wherein the first processing includes the single data storage system simulating the first data storage system servicing the first management command.

In at least one embodiment, the single data storage system may include a management database with a plurality of metadata records for the plurality of volumes, wherein each of the plurality of volumes may be described by metadata of a different one of the plurality of metadata records, and wherein each of the plurality of metadata records associated with a particular one of the plurality of volumes may include a same set of metadata describing the simulated stretched volume and may include one of the plurality of unique identifiers associated with the particular one of the plurality of volumes. A first volume of the plurality of volumes in the single data storage system may represent and simulate a particular one of the two or more volumes, wherein the particular one volume is included in the first data storage system, and wherein the first processing includes servicing the first management command using one of the plurality of metadata records associated with the first volume.

In at least one embodiment, a second set of target ports may be included in the plurality of sets of target ports of the single data storage system, wherein the second set of target ports may simulate paths to a second data storage system of the two or more data storage systems. A second volume of the plurality of volumes in the single data storage system may represent and simulate another one of the two or more volumes, wherein the another one volume may be included in the second data storage system.

In at least one embodiment, the first volume may be a regular volume configured in the single data storage system with the first unique identifier. The second volume may be a shadow volume of the regular volume, and wherein the shadow volume may be configured with a second unique identifier of the plurality of unique identifiers.

In at least one embodiment, the first processing may include using the first unique identifier to access a first set of metadata of a first of the plurality of metadata records associated with the regular volume. Servicing the first management command may include reading the first set of metadata associated with the first unique identifier; and returning a portion of the first set of metadata in accordance with the first management command. Servicing the first management command may include: updating, in accordance with the first management command, the first set of metadata of the first metadata record associated with the first unique identifier and the regular volume; and simulating replicating the first management command over a connection to the second data storage system. The connection may be configured for a simulation mode that simulates the stretched volume and wherein the connection may be configured from the single data system to the single data storage system. Simulating replicating the first management command over the connection to second data storage system may include: transmitting the first management command over the connection configured for the simulation mode; mapping the first unique identifier to the second unique identifier; and updating, in accordance with the first management command, a second set of metadata of a second of the plurality of metadata records associated with the second unique identifier and the shadow volume.

In at least one embodiment, processing may include: receiving, over a second path of the plurality of paths, a second management command directed to the simulated stretched volume configured as the same volume having the first unique identifier, wherein the second path is from an initiator of the host to a second target port of the single data storage system, wherein the second target port is included in the second set of the plurality of sets of target ports that simulates paths to the second data storage system; and performing second processing to service the second management command, wherein the second processing includes the single data storage system simulating the second data storage system servicing the second management command. The second processing may include: mapping the first unique identifier associated with the simulated stretched volume to the second unique identifier associated with the simulated stretched volume; and using the second unique identifier to access the second set of metadata of the second metadata record associated with the shadow volume. Servicing the second management command may include: reading the second set of metadata of the second metadata record associated with the second identifier and the shadow volume; and returning a portion of the second set of metadata in accordance with the second management command. Servicing the second management command may include: updating, in accordance with the second management command, the second set of metadata of the second metadata record associated with the second identifier and the shadow volume; and simulating replicating the second management command over the connection to the first data storage system.

In at least one embodiment, simulating replicating the second management command over the connection to the first data storage system may include: mapping the second unique identifier to the first unique identifier; transmitting the second management command over the connection configured for the simulation mode, wherein the second management command is directed to the regular volume having the first unique identifier; and updating, in accordance with the second management command, the first set of metadata of the first metadata record associated with the first unique identifier and the regular volume. Processing may include: receiving a first I/O command on the first path from the host to the single data storage system, wherein the first I/O command is directed to the simulated stretched volume configured as the same volume having the first unique identifier; and servicing the first I/O command using the regular volume. Processing may include receiving a second I/O command on the second path from the host to the single data storage system, wherein the I/O command is directed to the simulated stretched volume configured as the same volume having the first unique identifier; and servicing the second I/O command using the regular volume.

BRIEF DESCRIPTION OF THE DRAWINGS

Features and advantages of the present invention will become more apparent from the following detailed description of exemplary embodiments thereof taken in conjunction with the accompanying drawings in which:

FIGS. 10A, 10B and 10C are flowcharts of processing steps that may be performed in at least one embodiment in accordance with the techniques herein.

DETAILED DESCRIPTION OF EMBODIMENT(S)

Figure 1:
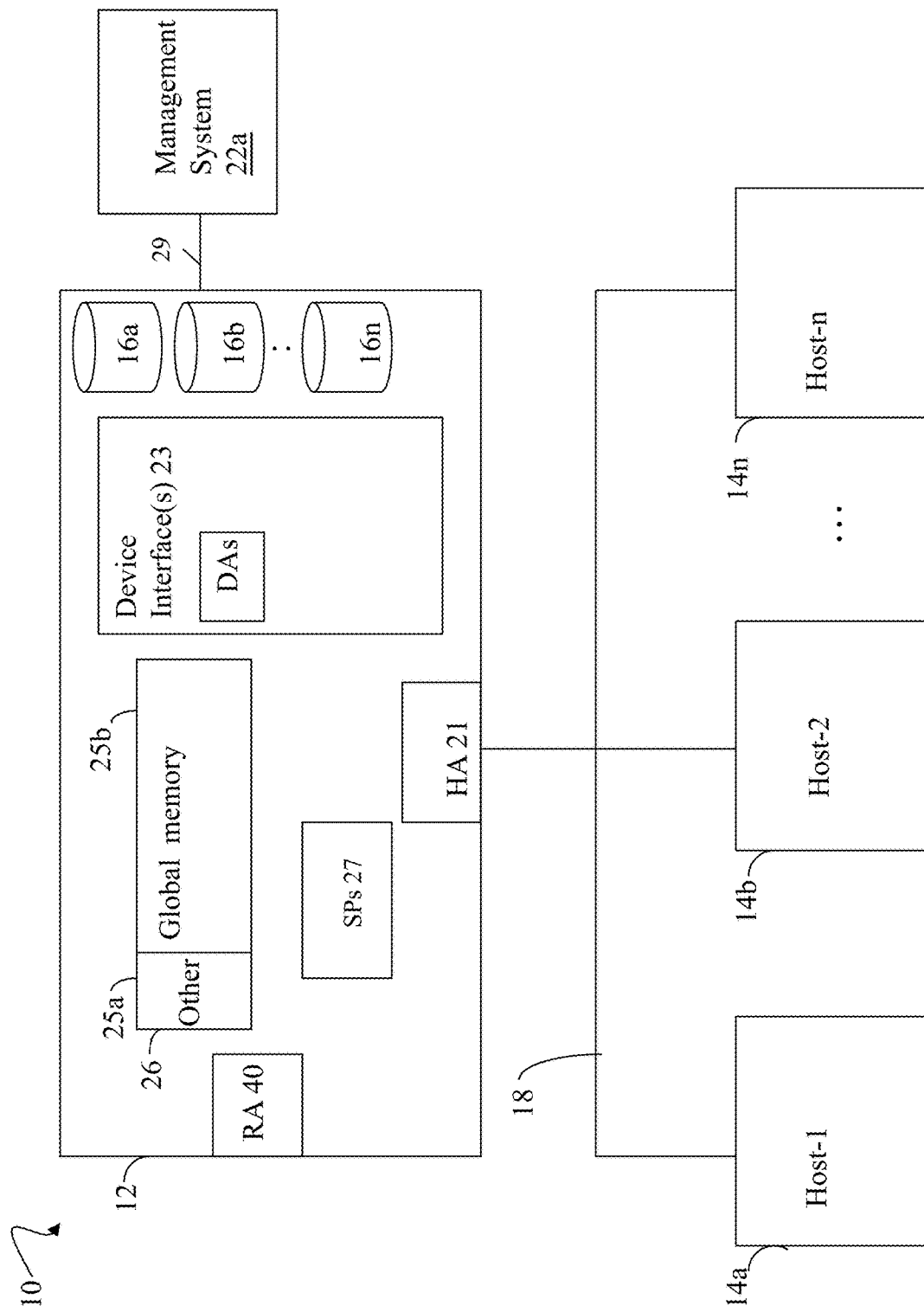
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
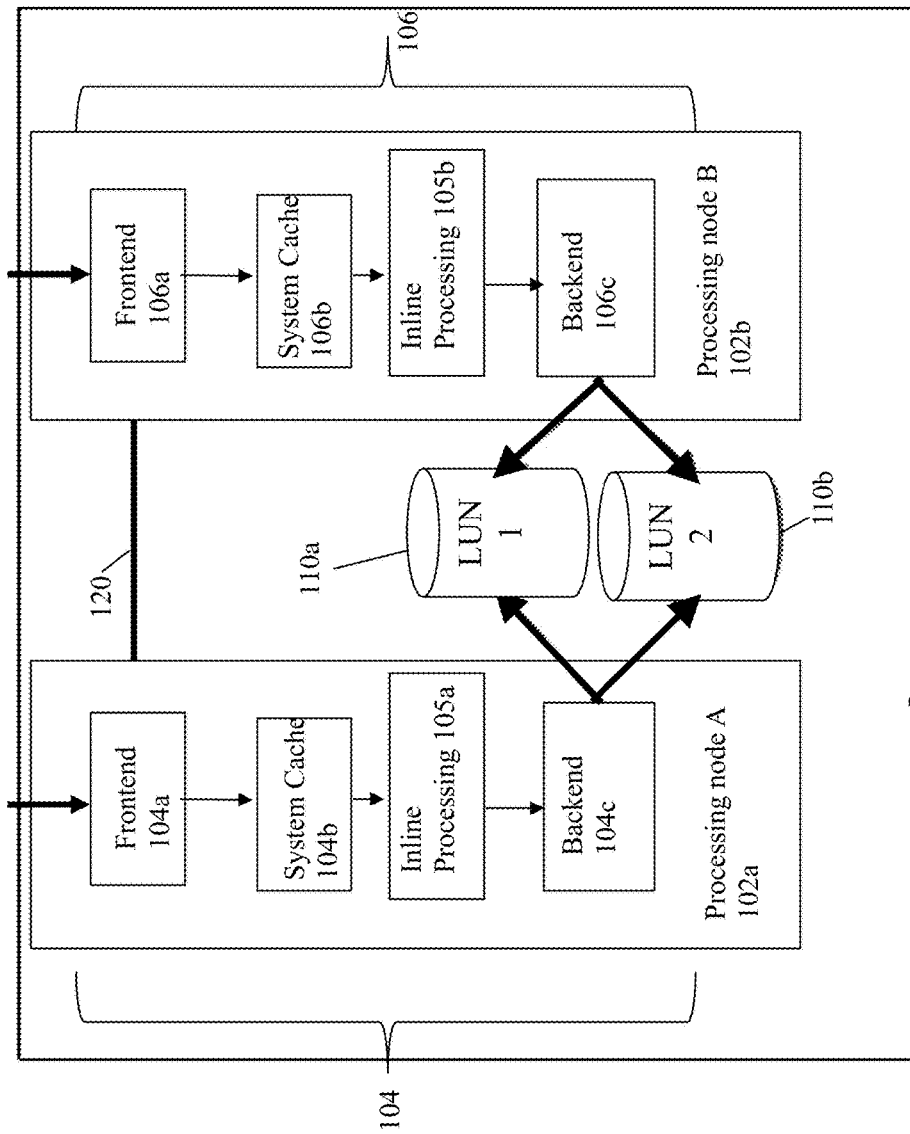
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data deduplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by code executing on the one or more processors of each node. Each node of the pair may include its own resources such as its own local (i.e., used only by the node) resources such as local processor(s), local memory, and the like.

Data replication is one of the data services that may be performed on a data storage system in an embodiment in accordance with the techniques herein. In at least one data storage system, remote replication is one technique that may be used in connection with providing for disaster recovery (DR) of an application's data set. The application, such as executing on a host, may write to a production or primary data set of one or more LUNs on a primary data storage system. Remote replication may be used to remotely replicate the primary data set of LUNs to a second remote data storage system. In the event that the primary data set on the primary data storage system is destroyed or more generally unavailable for use by the application, the replicated copy of the data set on the second remote data storage system may be utilized by the host. For example, the host may directly access the copy of the data set on the second remote system. As an alternative, the primary data set of the primary data storage system may be restored using the replicated copy of the data set, whereby the host may subsequently access the restored data set on the primary data storage system. A remote data replication service or facility may provide for automatically replicating data of the primary data set on a first data storage system to a second remote data storage system in an ongoing manner in accordance with a particular replication mode, such as a synchronous mode described elsewhere herein.

Figure 3:
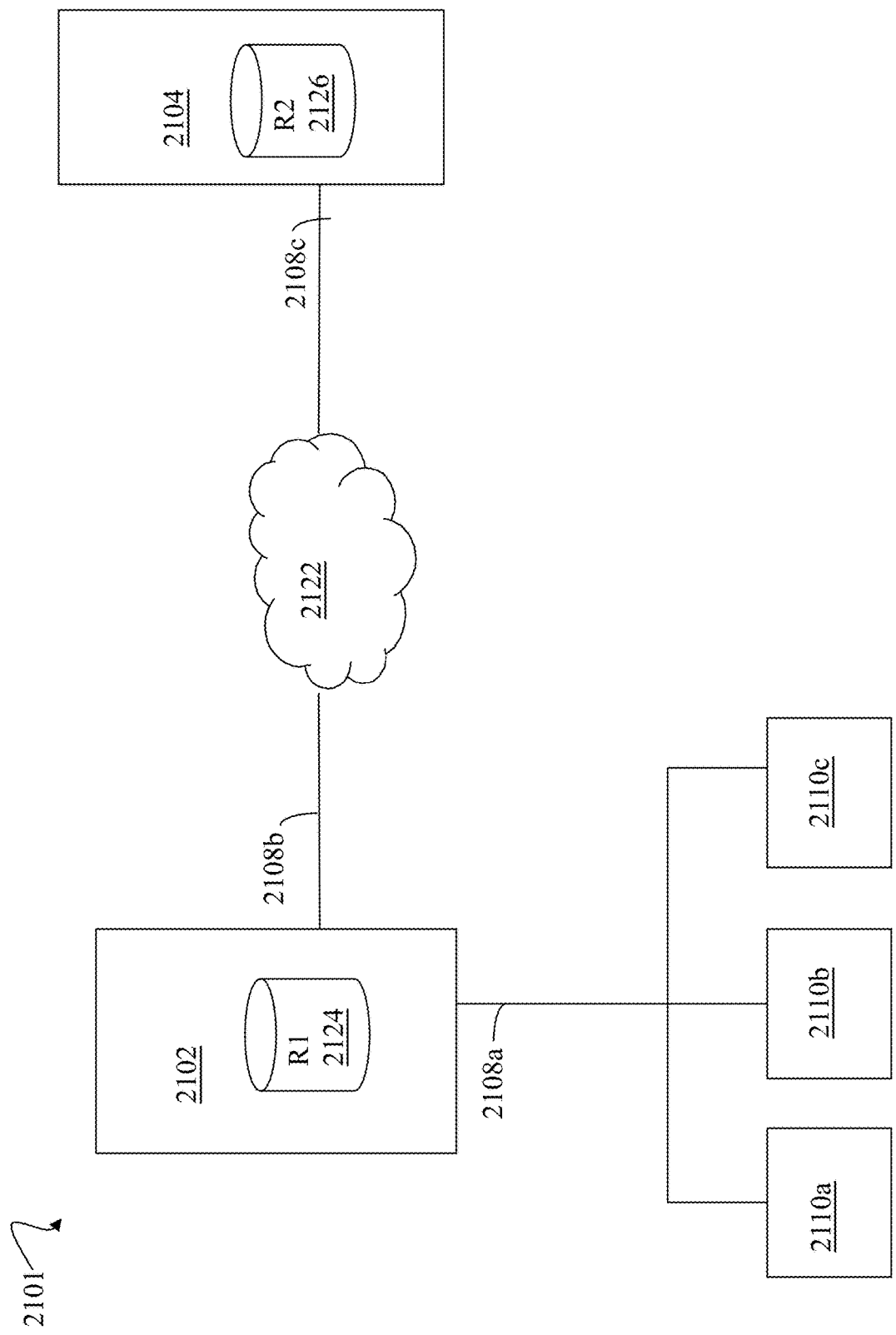
FIG. 3 is an example of systems that may be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 may be remotely connected and communicate over the network 2122, such as the Internet or other private network, and facilitate communications with the components connected thereto. The hosts 2110a, 2110b and 2110c may perform operations to the data storage system 2102 over the connection 2108a. The hosts 2110a, 2110b and 2110c may be connected to the data storage system 2102 through the connection 2108a which may be, for example, a network or other type of communication connection.

The data storage systems 2102 and 2104 may include one or more devices. In this example, the data storage system 2102 includes the storage device R1 2124, and the data storage system 104 includes the storage device R2 2126. Both of the data storage systems 2102, 2104 may include one or more other logical and/or physical devices. The data storage system 2102 may be characterized as local with respect to the hosts 2110a, 2110b and 2110c. The data storage system 104 may be characterized as remote with respect to the hosts 2110a, 2110b and 2110c. The R1 and R2 devices may be configured as LUNs.

The host 1210a may issue a command, such as to write data to the device R1 of the data storage system 2102. In some instances, it may be desirable to copy data from the storage device R1 to another second storage device, such as R2, provided in a different location so that if a disaster occurs that renders R1 inoperable, the host (or another host) may resume operation using the data of R2. With remote replication, a user may denote a first storage device, such as R1, as a primary storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF). In operation, the host 110a may read and write data using the R1 volume in 2102, and the RRF may handle the automatic copying and updating of data from R1 to R2 in the data storage system 2104. Communications between the storage systems 2102 and 2104 may be made over connections 2108b, 2108c to the network 2122.

A RRF may be configured to operate in one or more different supported replication modes. For example, such modes may include synchronous mode and asynchronous mode, and possibly other supported modes. When operating in the synchronous mode, the host does not consider a write I/O operation to be complete until the write I/O has been completed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

With synchronous mode remote data replication, a host 2110a may issue a write to the R1 device 2124. The primary or R1 data storage system 2102 may store the write data in its cache at a cache location and mark the cache location as including write pending (WP) data as mentioned elsewhere herein. The RRF operating in the synchronous mode may propagate the write data across an established connection or link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110a that the write has been received and completed. Thus, generally, R1 device 2124 and R2 device 2126 may be logical devices, such as LUNs, configured as mirrors of one another. R1 and R2 devices may be, for example, fully provisioned LUNs, such as thick LUNs, or may be LUNs that are thin or virtually provisioned logical devices.

Figure 4:
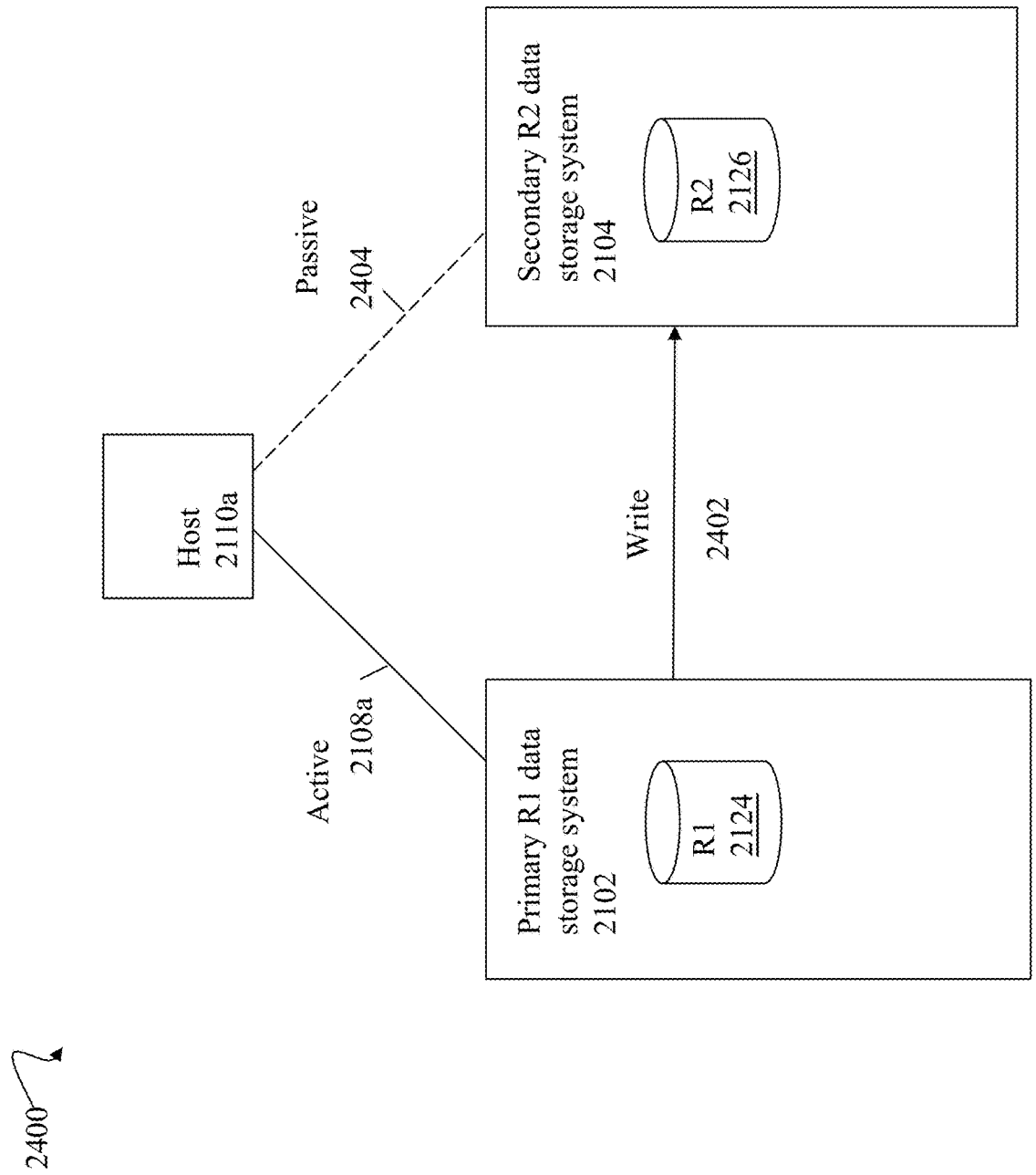
FIG. 4 is an example illustrating an active-passive replication arrangement.

With reference to FIG. 4, shown is a further simplified illustration of components that may be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, may also be used in connection with other information and communications exchanged between the systems 2101 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 may also be referred to herein as an active-passive configuration such as may be used with synchronous replication and other supported replication modes where the host 2110a has an active connection or path 2108a over which all I/Os are issued to only the R1 data storage system. The host 2110a may have a passive connection or path 2404 to the R2 data storage system 2104.

In the configuration of 2400, the R1 device 2124 and R2 device 2126 may be configured and identified as the same LUN, such as LUN A, to the host 2110a. Thus, the host 2110a may view 2108a and 2404 as two paths to the same LUN A, where path 2108a is active (over which I/Os may be issued to LUN A) and where path 2404 is passive (over which no I/Os to the LUN A may be issued). For example, the devices 2124 and 2126 may be configured to have the same logical device identifier such as the same world wide name (WWN) or other identifier as well as having other attributes or properties that are the same. Should the connection 2108a and/or the R1 data storage system 2102 experience a failure or disaster whereby access to R1 2124 configured as LUN A is unavailable, processing may be performed on the host 2110a to modify the state of path 2404 to active and commence issuing I/Os to the R2 device configured as LUN A. In this manner, the R2 device 2126 configured as LUN A may be used as a backup accessible to the host 2110a for servicing I/Os upon failure of the R1 device 2124 configured as LUN A.

The pair of devices or volumes including the R1 device 2124 and the R2 device 2126 may be configured as the same single volume or LUN, such as LUN A. In connection with discussion herein, the LUN A configured and exposed to the host may also be referred to as a stretched volume or device, where the pair of devices or volumes (R1 device 2124, R2 device 2126) is configured to expose the two different devices or volumes on two different data storage systems to a host as the same single volume or LUN. Thus, from the view of the host 2110a, the same LUN A is exposed over the two paths 2108a and 2404.

It should be noted although only a single replication link 2402 is illustrated, more generally any number of replication links may be used in connection with replicating data from systems 2102 to system 2104.

Figure 5:
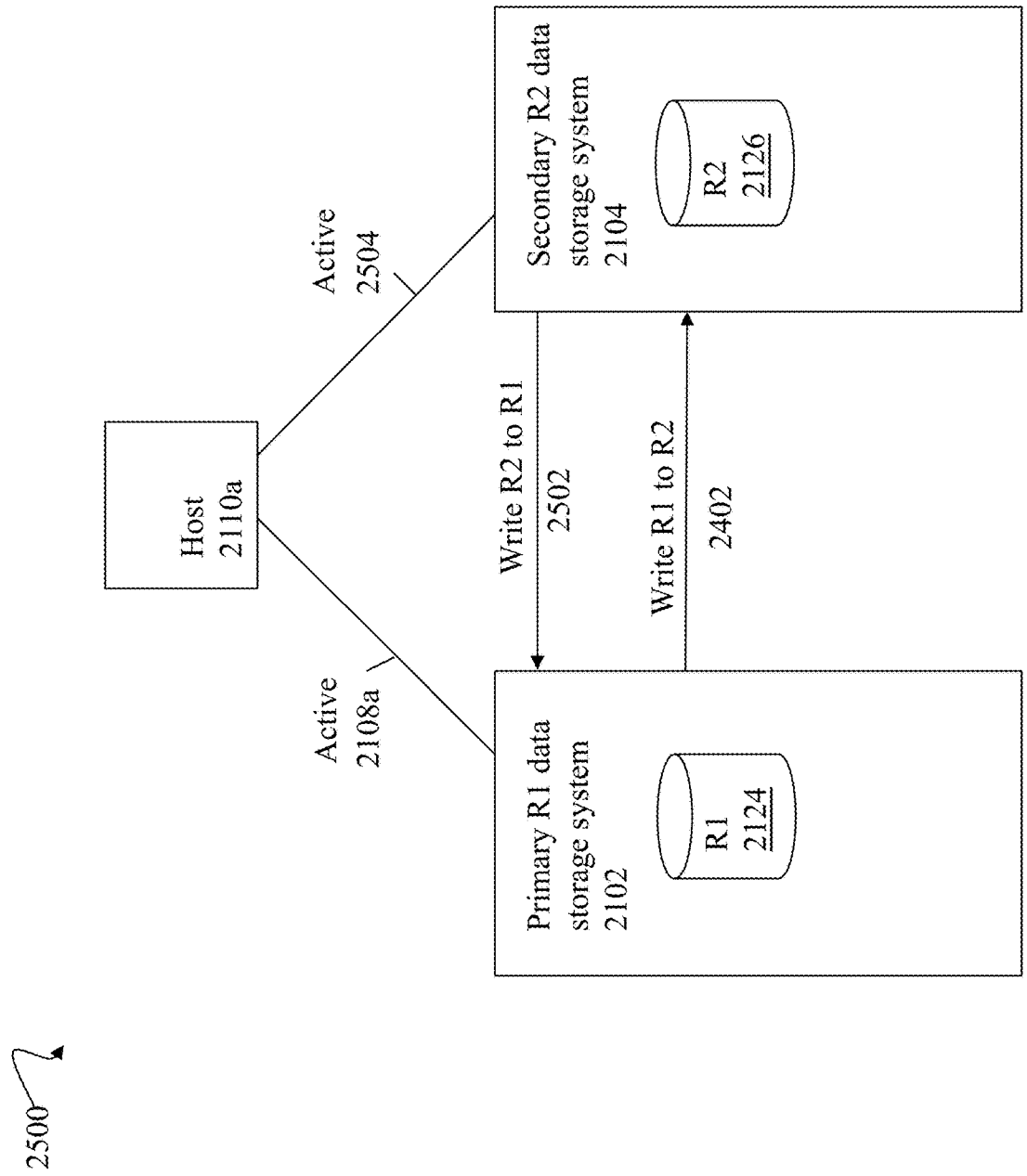
FIG. 5 is an example illustrating an active-active arrangement with a stretched volume.

Referring to FIG. 5, shown is an example configuration of components that may be used in an embodiment. The example 2500 illustrates an active-active configuration as may be used in connection with synchronous replication in at least one embodiment. In the active-active configuration with synchronous replication, the host 2110a may have a first active path 2108a to the R1 data storage system and R1 device 2124 configured as LUN A. Additionally, the host 2110a may have a second active path 2504 to the R2 data storage system and the R2 device 2126 configured as the same LUN A. From the view of the host 2110a, the paths 2108a and 2504 appear as 2 paths to the same LUN A as described in connection with FIG. 4 with the difference that the host in the example 2500 configuration may issue I/Os, both reads and/or writes, over both of the paths 2108a and 2504 at the same time. The host 2110a may send a first write over the path 2108a which is received by the R1 system 2102 and written to the cache of the R1 system 2102 where, at a later point in time, the first write is destaged from the cache of the R1 system 2102 to physical storage provisioned for the R1 device 2124 configured as the LUN A. The R1 system 2102 also sends the first write to the R2 system 2104 over the link 2402 where the first write is written to the cache of the R2 system 2104, where, at a later point in time, the first write is destaged from the cache of the R2 system 2104 to physical storage provisioned for the R2 device 2126 configured as the LUN A. Once the first write is written to the cache of the R2 system 2104, the R2 system 2104 sends an acknowledgement over the link 2402 to the R1 system 2102 that it has completed the first write. The R1 system 2102 receives the acknowledgement from the R2 system 2104 and then returns an acknowledgement to the host 2110a over the path 2108a, where the acknowledgement indicates to the host that the first write has completed.

The host 2110a may also send a second write over the path 2504 which is received by the R2 system 2104 and written to the cache of the R2 system 2104 where, at a later point in time, the second write is destaged from the cache of the R2 system 2104 to physical storage provisioned for the R2 device 2126 configured as the LUN A. The R2 system 2104 also sends the second write to the R1 system 2102 over a second link 2502 where the second write is written to the cache of the R1 system 2102, and where, at a later point in time, the second write is destaged from the cache of the R1 system 2102 to physical storage provisioned for the R1 device 2124 configured as the LUN A. Once the second write is written to the cache of the R1 system 2102, the R1 system 2102 sends an acknowledgement over the link 2502 to the R2 system 2104 that it has completed the second write. Once the R2 system 2104 receives the acknowledgement from the R1 system (regarding completion of the second write), the R2 system 2104 then returns an acknowledgement to the host 2110a over the path 2504 that the second write has completed.

As discussed in connection with FIG. 4, the FIG. 5 also includes the pair of devices or volumes—the R1 device 2124 and the R2 device 2126—configured as the same single stretched volume, the LUN A. From the view of the host 2110a, the same stretched LUN A is exposed over the two active paths 2504 and 2108a.

In the example 2500, the illustrated active-active configuration includes the stretched LUN A configured from the device or volume pair (R1 2124, R2 2126), where the device or object pair (R1 2124, R2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication: synchronous remote replication of writes from R1 2124 to R2 2126, and synchronous remote replication of writes from R2 2126 to R1 2124. To further illustrate synchronous remote replication from the system 2102 to the system 2104 for the stretched LUN A, a write to the stretched LUN A sent over 2108a to the system 2102 is stored on the R1 device 2124 and also transmitted to the system 2104 over 2402. The write sent over 2402 to system 2104 is stored on the R2 device 2126. Such replication is performed synchronously in that the received host write sent over 2108a to the data storage system 2102 is not acknowledged as successfully completed to the host 2110*a* unless and until the write data has been stored in caches of both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the R2 device 2124. Such replication is performed synchronously in that the acknowledgement to the host write sent over 2504 is not acknowledged as successfully completed unless and until the write data has been stored in the caches of both the systems 2102 and 2104.

It should be noted that although FIG. 5 illustrates for simplicity a single host accessing both the R1 device 2124 and R2 device 2126, any number of hosts may access one or both of the R1 device 2124 and the R2 device 2126.

Although only a single link 2402 is illustrated in connection with replicating data from systems 2102 to system 2104, more generally any number of links may be used. Although only a single link 2502 is illustrated in connection with replicating data from systems 2104 to system 2102, more generally any number of links may be used. Furthermore, although 2 links 2402 and 2502 are illustrated, in at least one embodiment, a single link may be used in connection with sending data from system 2102 to 2104, and also from 2104 to 2102.

FIG. 5 illustrates an active-active remote replication configuration for the stretched LUN A. The stretched LUN A is exposed to the host by having each volume or device of the device pair (R1 device 2124, R2 device 2126) configured and presented to the host as the same volume or LUN A. Additionally, the stretched LUN A is configured for two way synchronous remote replication between the two devices or volumes of the device pair.

In an embodiment described herein, the data storage system may be a SCSI-based system such as SCSI-based data storage array. An embodiment in accordance with the techniques herein may include hosts and data storage systems which operate in accordance with the standard SCSI Asymmetrical Logical Unit Access (ALUA). The ALUA standard specifies a mechanism for asymmetric or symmetric access of a logical unit or LUN as used herein. ALUA allows the data storage system to set a LUN's access state with respect to a particular initiator port and the target port. Thus, in accordance with the ALUA standard, various access states (also sometimes referred to herein as ALUA states or path states) may be associated with a path with respect to a particular device, such as a LUN. In particular, the ALUA standard defines such access states including the active-optimized, active-non optimized, and unavailable states as described herein. The ALUA standard also defines other access states, such as standby and in-transition or transitioning (i.e., denoting that a particular path is in the process of transitioning between states for a particular LUN). A recognized path (such as recognized by a host as a result of discovery processing) over which I/Os (e.g., read and write I/Os) may be issued to access data of a LUN may have an "active" state, such as active-optimized or active-non-optimized. Active-optimized is an active path to a LUN that is preferred over any other path for the LUN having an "active-non optimized" state. A path for a particular LUN having the active-optimized path state may also be referred to herein as an optimized or preferred path for the particular LUN. Thus active-optimized denotes a preferred path state for the particular LUN. A path for a particular LUN having the active-non optimized (or unoptimized) path state may also be referred to herein as a non-optimized or non-preferred path for the particular LUN. Thus active-non-optimized denotes a non-preferred path state with respect to the particular LUN. Generally, I/Os directed to a LUN that are sent by the host to the data storage system over active-optimized and active-non optimized paths are processed by the data storage system. However, the host may select to send I/Os to a LUN from those paths having an active-optimized state for the LUN. The host may proceed to use a path having an active non-optimized state for the LUN only if there is no active-optimized path for the LUN. A recognized path over which I/Os may not be issued to access data of a LUN may have an "unavailable" state. When a path to a LUN is in the unavailable state, a limited set of non-I/O-based commands (e.g. other than read and write commands to, respectively, read and write user data), such as the SCSI INQUIRY, may be issued. It should be noted that such limited set of non I/O based commands may also be issued over an active (e.g., active optimized and active non-optimized) path as well.

Figure 6:
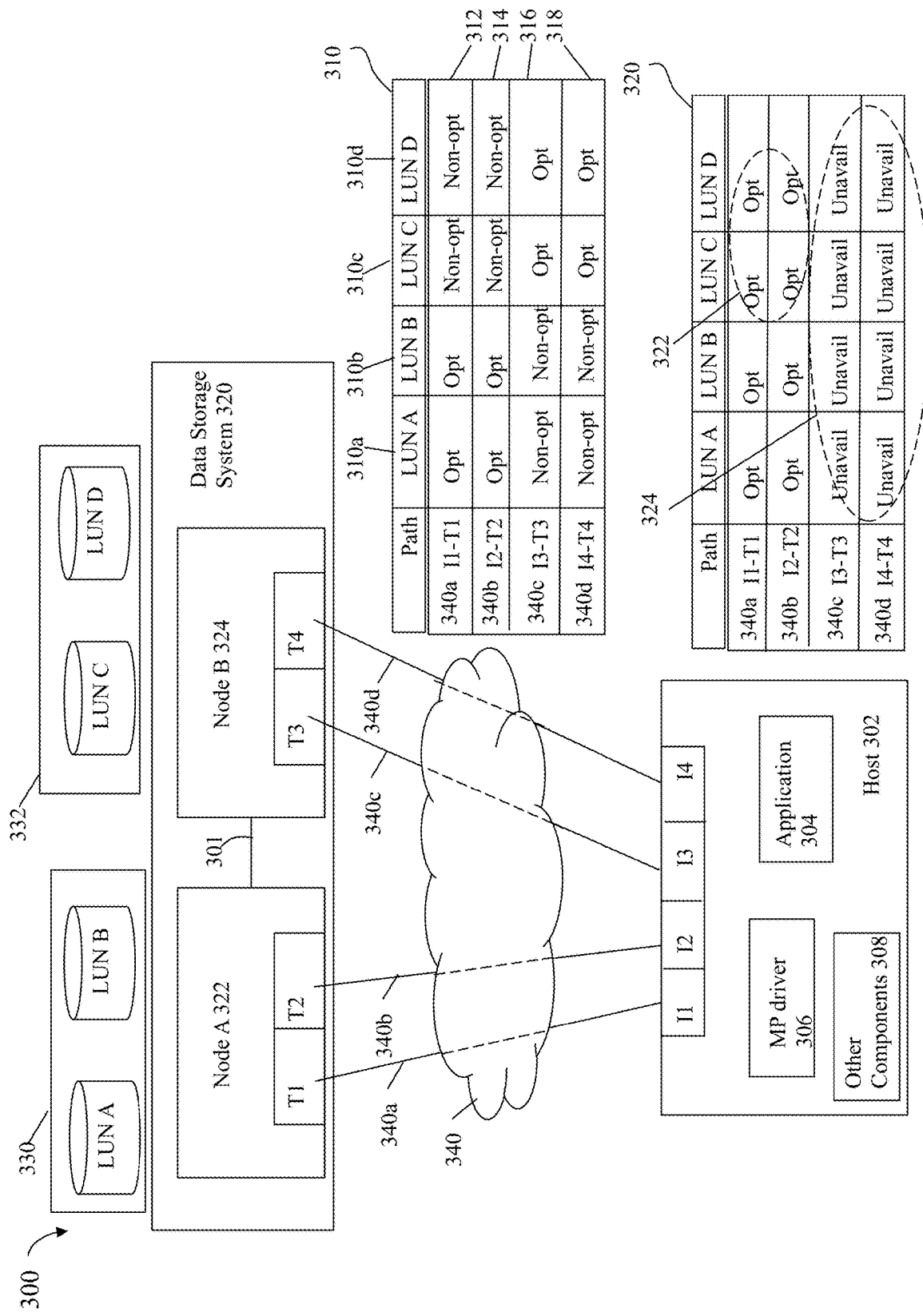
FIG. 6 is an example illustrating path states for paths between a host and a data storage system.

Referring to FIG. 6, shown is an example of an embodiment of a system that may be utilized in connection with the techniques herein. The example 300 includes a host 302, a network 340 and a data storage system 320. The host 302 and the data storage system 320 may communicate over one or more paths 340*a-d* through the network 340. The paths 340*a-d* are described in more detail below. The LUNs A and B are included in the set 330, and the LUNs C and D are included in the set 332. The LUNs of the sets 330 and 332 are configured from non-volatile BE storage PDs of the data storage system 320. The data storage system includes two nodes—node A 322 and node B 324. The nodes 322, 324 may be as described elsewhere herein. The element 301 denotes an internode communication connection similar, for example, to the connection 120 of FIG. 2. Consistent with other discussion herein such as in connection with FIG. 2, the BE PDs from which storage is provisioned for the LUNs of 330, 332 are accessible to both the nodes 322, 324.

The host 202 may include an application 304, a multi-path (MP) driver 306 and other components 308. The other components 308 may include, for example, one or more other device drivers, an operating system, and other code and components of the host. An I/O operation from the application 304 may be communicated to the data storage system 320 using the MP driver 306 and one or more other components of the data path or I/O path. The application 304 may be a database or other application which issues data operations, such as I/O operations, to the data storage system 320. Each of the I/O operations may be directed to a LUN, such as one of the LUNs of 330, 332, configured to be accessible to the host 302 over multiple physical paths. As such, each of the I/O operations may be forwarded from the application 304 to the data storage system 320 over one of the possible multiple paths.

The MP driver 306 may include functionality to perform any one or more different types of processing such as related to multipathing. For example, the MP driver 306 may include multipathing functionality for management and use of multiple paths. For example, the MP driver 306 may perform path selection to select one of the possible multiple paths based on one or more criteria such as load balancing to distribute I/O requests for the target device across available active-optimized or preferred paths. Host side load balancing may be performed by the MP driver to provide for better resource utilization and increased performance of the host, data storage system, and network or other connection infrastructure. The host 302 may also include other components 308 such as one or more other layers of software used in connection with communicating the I/O operation from the host to the data storage system 120. For example, element 108 may include Fibre Channel (FC), SCSI and NVMe (Non-Volatile Memory Express) drivers, a logical volume manager (LVM), and the like. It should be noted that element 308 may include software or other components used when sending an I/O operation from the application 304 where such components include those invoked in the call stack of the data path above the MP driver 306 and also below the MP driver 306. For example, application 304 may issue an I/O operation which is communicated in the call stack including an LVM, the MP driver 306, and a SCSI driver.

The data storage system 320 may include one or more BE PDs configured to store data of one or more LUNs. Each of the LUNs 330, 332 may be configured to be accessible to the host 302 through multiple paths. The node A 322 in this example has two data storage system target ports T1 and T2. The node B 324 in this example has two data storage system target ports T3 and T4. The host 302 includes 4 host initiator ports I1, I2, I3 and I4. The path 340a is formed using the endpoints I1 and T1 and may be denoted as I1-T1. The path 340b is formed using the endpoints I2 and T2 and may be denoted as I2-T2. The path 340c is formed using the endpoints I3 and T3 and may be denoted as I3-T3. The path 340d is formed using the endpoints I4 and T4 and may be denoted as I4-T4.

In at least one embodiment in accordance with the SCSI standard, each of the initiators and target ports in FIG. 6 as well as other figures herein may be unique WWNs.

In this example, all of the LUNs A, B C and D may be accessible or exposed over all the data storage system target ports T1, T2, T3 and T4 over the paths 340a-d. As described in more detail below, a first set of paths to the node A 322 may be specified as active-optimized or preferred for the LUNs of the set 330 and a second set of paths to the node B 324 may be specified as active-optimized or preferred for the LUNs of the set 332. Additionally the first set of paths to the node A 322 may be specified as active-non optimized or non-preferred for the LUNs of the set 332 and the second set of paths to the node B 324 may be specified as active-non optimized or non-preferred for the LUNs of the set 330.

The multiple active paths allow the application I/Os to the LUNs A, B C and D to be routed over the multiple paths 340a-d and, more generally, allow the LUNs A, B C and D to be accessed over the multiple paths 340a-d. In the event that there is a component failure in one of the active-optimized multiple paths for a particular LUN, application I/Os directed to the particular LUN can be easily routed over other alternate preferred paths unaffected by the component failure. Additionally, in the event there are no preferred paths available for issuing I/Os to the particular LUN, non-preferred paths for the particular LUN may be used to send the I/Os to the particular LUN. Thus, an embodiment of the MP driver 306 may also perform other processing in addition to load balancing in connection with path selection. The MP driver 106 may be aware of, and may monitor, all paths between the host and the LUNs A, B C and D in order to determine that particular state of such paths with respect to the various LUNs. In this manner, the MP driver may determine which of the multiple paths over which a LUN is visible may be used for issuing I/O operations successfully. Additionally, the MP driver may use such information to select a path for host-data storage system communications issued to the particular LUN.

In the example 300, each of the LUNs A, B C and D may be exposed through the 4 paths 340a-d. As described in more detail below, each of the paths 340a-d may have an associated ALUA state also used by the host when issuing I/O operations. Each path 340a-d may be represented by two path endpoints—a first endpoint on the host 302 and a second endpoint on the data storage system 320. The first endpoint may correspond to a port of a host component, such as a host bus adapter (HBA) of the host 302, and the second endpoint may correspond to a target port of a data storage system component, such as a target port of a node of the data storage system 320. In the example 300, the elements I1, I2, I3 and I4 each denote a port of the host 302 (e.g. such as a port of an HBA), and the elements T1, T2 T3 and T4 each denote a target port of a node of the data storage system 320.

The MP driver 306, as well as other components of the host 302, may execute in kernel mode or other privileged execution mode. In one embodiment using a Unix-based operating system, the MP driver 306 may execute in kernel mode. In contrast, the application 304 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, the application 304 may issue one or more I/O operations (e.g., read and write commands or operations) directed to the LUNs 330, 332 of the data storage system. Such I/O operations from the application 304 may be directed to the MP driver 306 after passing through any intervening layers of the data or I/O path.

In connection with the SCSI standard, a path may be defined between two ports as described above. A command may be sent from the host (as well as a component thereof such as a HBA) and may be characterized as an initiator, originator or source with respect to the foregoing path. The host, as the initiator, sends requests to a data storage system (as well as a particular component thereof such as node having a port with a network address) characterized as a target, destination, receiver, or responder. Each physical connection of a path may be between a first endpoint which is an initiator port (e.g., I1) of the host and a second endpoint (e.g., T1) which is a target port of node in the data storage system. Over each such path, one or more LUNs may be visible or exposed to the host initiator through the target port of the data storage system.

In connection with some protocols such as the SCSI protocol, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a LBA within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In an embodiment described herein, the data storage system 320 may be a SCSI-based system such as SCSI-based data storage array operating in accordance with the ALUA standard. As described herein, a data storage system in accordance with techniques herein may set an access path state for a particular LUN over a particular path from an initiator to a target of the data storage system. For example, the data storage system may set an access path state for a particular LUN on a particular path to active-optimized (also referred to herein as simply "optimized" or "preferred") to denote the path as a preferred path for sending I/Os directed to the LUN. The data storage system may set an access path state for a particular LUN on a particular path to active-non optimized (also referred to herein as simply "non-optimized" or "non-preferred") to denote a non-preferred path for sending I/Os directed to the LUN sent. The data storage system may also set the access path state for a particular LUN on a particular path to other suitable access states. Although discussion herein may refer to the data storage system setting and modifying the path access states of the paths between the host and the data storage system, in some embodiments, a host may also set and/or modify the path access states which are then communicated to the data storage system.

In accordance with the techniques herein, the data storage system may set the path state for a particular LUN to preferred or non-preferred for any suitable purpose. In at least one embodiment, multipathing software, such as the MP driver, on the host may monitor the particular access path state as may be set by the data storage system with respect to a particular LUN to determine which path to select for sending I/Os to the LUN. Thus, when the LUN is exposed to a host initiator over multiple paths (e.g., where the same LUN is accessible through multiple different target ports of the data storage system), the data storage system may vary the associated access state of each such path in order to vary and control the particular ones of the multiple paths over which the host may issue I/Os to the LUN.

The element 330 indicates that the LUN A and the LUN B are exposed to the host 302 over preferred paths to the node A 322 and non-preferred paths to the node B 324. The element 332 indicates that the LUN C and the LUN D are exposed to the host 302 over preferred paths to the node B 324 and non-preferred paths to the node A 322. Thus, the paths 340c-d to the target ports T3 and T4 of node B 324 are set to optimized or preferred for the LUNs C and D and set to non-optimized or non-preferred for the remaining LUNs A and B; and the paths 340a-b to the target ports T1 and T2 of node A 322 are set to preferred or optimized for the LUNs A and B and set to non-optimized or non-preferred for the remaining LUNs C and D.

In at least one embodiment, target ports are given identifiers and may be organized into target port groups (TPGs). In at least one embodiment, a TPG may be defined as a logical grouping or collection of one or more target port identifiers that share the same access characteristics for a particular LUN. For example, target ports T1 and T2 may be included in a first TPG and target ports T3 and T4 may be included in a second TPG. With ALUA in at least one embodiment, a LUN may be visible with respect to the entire TPG rather than on a port level basis. In other words, a LUN may be exposed or visible on a TPG level. If the LUN is visible or accessible on a first target port in the first TPG including that first target port, then the LUN is also accessible or visible on all targets ports of the first TPG. Each TPG can take on a state (e.g., preferred or non-preferred). For a given LUN, the LUN is visible on the TPG level basis (e.g. with respect to all target ports of a TPG). Thus the LUN has the same path state or access characteristic with respect to all target ports of the same TPG. For example, the first TPG noted above may include all target ports of one of the nodes such as node A 322 over which the LUNs A, B, C and D are exposed; and the second TPG noted above may include all target ports of one of the nodes such as node B 324 over which the LUNs A, B, C and D are exposed.

The table 310 denotes the different path states for each of the 4 paths for the 4 LUNs A, B, C and D. The table 310 reflects the path states as discussed above. The row 312 indicates that path I1-T1 including the target port T1 of node A 322 is active optimized (opt) or preferred for the LUNs A and B and active non-optimized (non-opt) or non-preferred for the LUNs C and D. The row 314 indicates that path I2-T2 including the target port T2 of node A 322 is optimized (opt) or preferred for the LUNs A and B and non-optimized (non-opt) or non-preferred for the LUNs C and D. The row 316 indicates that path I3-T3 including the target port T3 of node B 324 is optimized (opt) or preferred for the LUNs C and D and non-optimized (non-opt) or non-preferred for the LUNs A and B. The row 318 indicates that path I4-T4 including the target port T4 of node B 324 is optimized (opt) or preferred for the LUNs C and D and non-optimized (non-opt) or non-preferred for the LUNs A and B.

Assume further, for example, the node B 324 of the data storage system 320 now experiences a failure so that the target ports T3 and T4 and thus the paths 340c, 340d are unavailable. In response to the failure of the node B 324 and the target ports T3 and T4, the path states may be updated from the states of the table 310 to the revised path states of the table 320. In the table 320, due to the failure and unavailability of the paths 340c-d, 1) the path states of 322 indicate that the path 340a I1-T1 and the path 340b I2-T2 have transitioned from the non-optimized to the optimized or preferred path state for the LUNs C and D; and 2) the path states of 324 indicate that the path I3-T3 340c and the path 340d I4-T4 for the LUNs A, B, C and D have transitioned to the unavailable state.

It is noted that other embodiments may have different path state changes than as denoted by the table 320.

A metro cluster configuration may be used herein to refer to a configuration including two data storage systems respectively configured with two devices or volumes with the same identity that cooperate to expose a stretched volume or LUN, such as in the FIGS. 4 and 5, to one or more hosts. In the metro cluster configuration, the hosts and applications running on the hosts perceive the two devices or volumes configured to have the same identity as the same single stretched volume, device or LUN.

In a metro cluster configuration, each of the two data storage systems may be in different data centers or may be in two server rooms or different physical locations within the same data center. The metro cluster configuration may be used in a variety of different use cases such as, for example, increased availability and disaster avoidance and DR, resource balancing across data centers and data storage systems, and storage migration.

In a metro cluster configuration, hosts may be configured with uniform host connectivity as illustrated in FIGS. 4 and 5, where a host may be connected to both data storage systems exposing the pair of devices or volumes configured as the same stretched volume or LUN, such as the LUN A described in connection with FIG. 5. From the perspective of the host 2110a of FIG. 5, the data storage system 2102 may be a local data storage system included in the same data center as the host 2110a, and the data storage system 2104 may be a remote data storage system. Thus the host 2110a is configured with uniform host connectivity. In contrast to uniform host connectivity is non-uniform host connectivity, where the host is only connected to the local data storage system but not the remote data storage system of the metro cluster configuration.

Figure 7A:
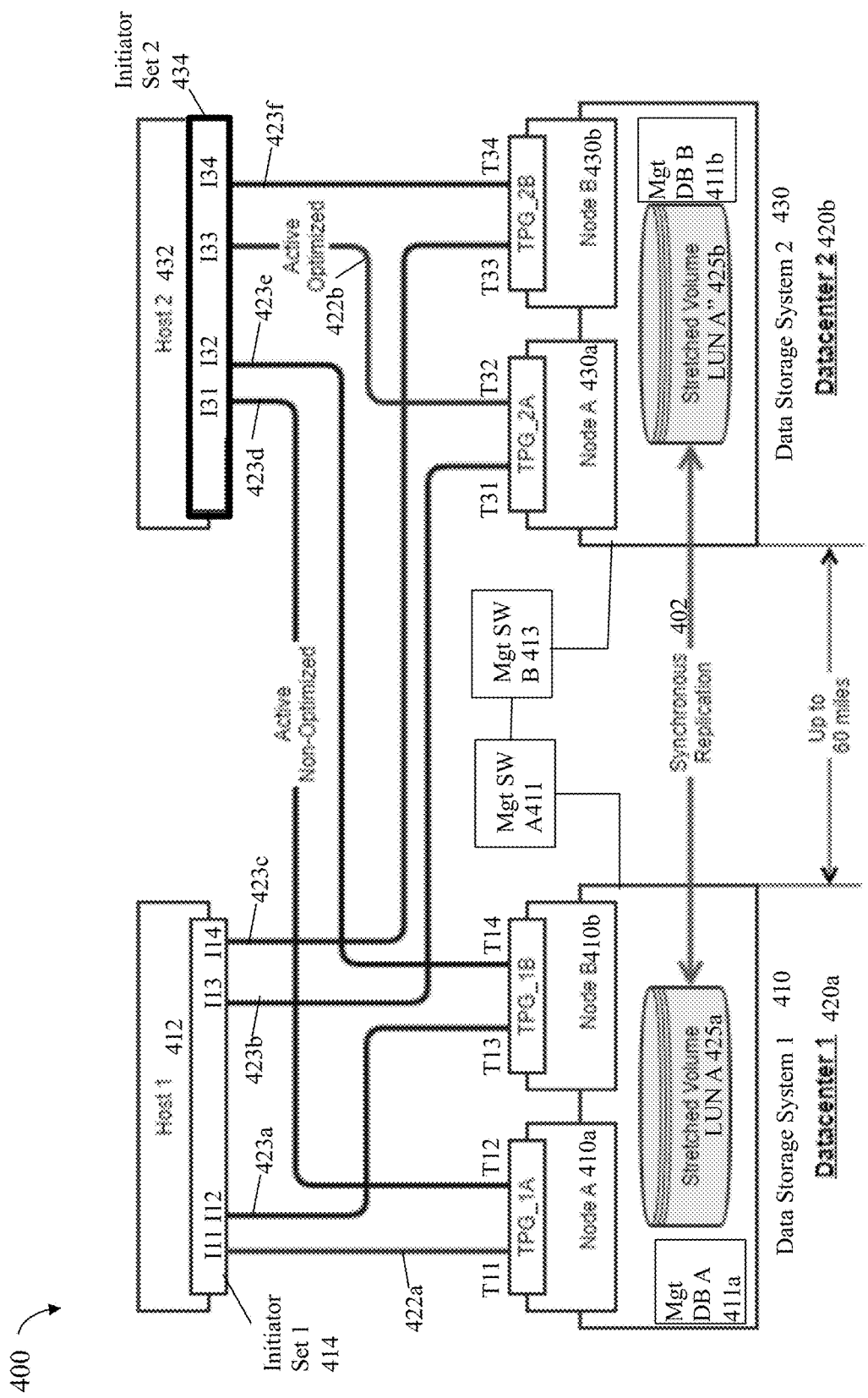
FIGS. 7A and 7B are examples illustrating path states for paths between multiple data storage systems and multiple hosts in a metro cluster configuration with a stretched volume.

Referring to FIG. 7A, shown is a more detailed illustration of a metro cluster configuration. The example 400 includes a stretched volume or LUN A and two hosts configured 412, 414 with uniform host connectivity in at least one embodiment.

In the FIG. 7A, the host 1 412 and the data storage system 1 410 are in the data center 1 420a. The host 2 414 and the data storage system 2 430 are in the data center 2 420b. The host 1 412 includes the initiators I11-I14. The host 432 includes the initiators I31-I34. The data storage systems 410, 430 may be dual node data storage systems such as described elsewhere herein (e.g., FIG. 2). The data storage system 410 includes the node A 410a with the target ports T11-T12, and the node B 410b with the target ports T13-T14. The data storage system 430 includes the node A 430a with the target ports T31-T32, and the node B 430b with the target ports T33-T34. From the perspective of host 1 412, the data storage system 1 410 and data center 1 420a may be characterized as local, and the data storage system 2 430 and the data center 2 420b may be characterized as remote. From the perspective of host 2 432, the data storage system 1 410 and data center 1 420a may be characterized as remote, and the data storage system 2 430 and the data center 2 420b may be characterized as local.

As illustrated in the FIG. 7A, the stretched volume or LUN A is configured from the device or volume pair LUN A 425a and LUN A" 425b, where both the LUNs or volumes 425a-b are configured to have the same identity from the perspective of the hosts 412, 432. The LUN A 425a and the LUN A" 425b are configured for two way synchronous remote replication 402 which, consistent with other description herein, provides for automated synchronous replication of writes of the LUN A 425a to the LUN A" 425b, and also automated synchronous replication of writes of the LUN A" 425b to the LUN A 425a. The LUN A 425a may be exposed to the hosts 412, 432 over the target ports T11-T14 of the system 410, and the LUN A" 425b may be exposed to the hosts 412, 432 over the target ports T31-T34.

In at least one embodiment in which the arrangement of FIG. 7A is in accordance with the ALUA protocol, the paths 423a-f may be configured with the path state of active non-optimized and the paths 422a-b may be configured with the path state of active optimized. Thus, the host 412 has uniform host connectivity to the stretched volume or LUN A by the active connections or paths 422a (I11-T11), 423a (I12-T13) to the data storage system 410 exposing the LUN A 425a, and the active connections or paths 423b (I13-T31), 423c (I14-T33) to the data storage system 430 exposing LUN A" 425b. The host 432 has uniform host connectivity to the stretched volume or LUN A by the active connections or paths 423d (I31-T12), 423e (I32-T14) to the data storage system 410 exposing the LUN A 425a, and the active connections or paths 422b (I33-T32), 423f (I34-T34) to the data storage system 430 exposing the LUN A" 425b.

Uniform host connectivity deployments such as illustrated in FIG. 7A offer high resiliency to failure of any local component or cross data center connection. Failures such as a total loss of a local storage system (that is local from a host's perspective) result in the host performing I/Os using the cross-datacenter links to the remote data storage system, which results in increased latency but does not require immediate application restart since I/Os issued from the host are still serviced using the remote data storage system. FIG. 7A illustrates a configuration that may also be referred to as a metro cluster configuration with a pair of data storage systems 410, 430. With respect to a host, such as the host 412, one of the data storage systems, such as the system 410, may be local and in the same data center as the host, and the other remaining data storage system, such as the system 430, may be remote and in a different location or data center than the host 412.

With reference to FIG. 7A, the element 411 denotes the data storage system management software application A for the system 410, and the element 413 denotes the data storage system management application B for the system 430. The management applications 411 and 413 may communicate with one another through a network or other suitable communication connection when performing the processing needed for the techniques described herein. The element 411a represents the management database (DB) A that stores management and other information used by the management application A 411 for the system 410. The element 413a represents the management DB B that stores management and other information used by the management application B 413 for the system 430.

To further illustrate, the FIG. 7A may denote the path states at a first point in time T1. At a second point in time T2 subsequent to T1 and illustrated in the FIG. 7B, the data storage system 2 430 may experience a failure or disaster where the LUN A" 425b on data storage on the system 430 is unavailable and cannot be accessed through the target ports T31-34. In response to the unavailability of the data storage system 430, the host 2 432 uses the path 454b to issue I/Os to the LUN A 425a on the data storage system 410. Thus, failure of the system 430 that is local to the host 432 results in the host 432 performing I/Os using the cross-data center link 454b to the remote system 410 which results in increased latency but does not require immediate application restart since I/Os issued by the application 3 (app 3) on the host 432 may still be serviced using the remote system 410.

In response to the unavailability of the data storage system 430, the paths 452a-d to the system 430 transition to the unavailable path state, the path 454a remains active optimized, the path 454b transitions from active non-optimized to active optimized, and the remaining paths 456a-b remain active non-optimized.

FIG. 7A illustrates connectivity between the hosts 412, 432 and the data storage systems 410, 430 under normal operating conditions where both systems 410, 430 and both volumes or LUNs 425a, 425b are available to the hosts 412, 432 for servicing I/Os. In such normal operating conditions, the ALUA path states may be as described in connection with FIG. 7A where each of the hosts 412, 432 issues I/Os to the particular one of the systems 410, 430 that is local or in the same data center as the particular host. In such normal operating conditions as illustrated in FIG. 7A, at least one "local path" between the host and the local data storage system is active optimized, and remote paths between the host and the remote data storage system are active non-optimized. One or more of the remote paths with respect to a particular host may be used in the event the local data storage system and/or local paths to the local data storage system are unavailable such as described in connection with FIG. 7B with respect to the host 412.

Thus, in the absence of a data storage system failure and under normal operating conditions such as illustrated in FIG. 7A, the host 412 issues I/Os to its local data storage system 410 where the host 412 and the system 410 are located in the same data center 420*a*; and the host 432 issues I/Os to its local data storage system 430 where the host 432 and the system 430 are located in the same data center 420*b*.

Generally, there are several ways to accomplish having each host under normal conditions issue I/Os to a local data storage system in the same data center as the host.

In some implementations, a native host multi-path driver or a third party multi-path drive may be able to differentiate the particular paths to the local data storage system and the particular paths to the remote data storage system based on path latency. Generally the paths experiencing the largest latencies when sending an I/O may be determined as those to the remote data system, and those with the smallest latencies may be determined as those to the local data storage system. In such implementations, the host utilizes its multi-path driver to select a particular path to a local data storage system over which to send I/Os.

Figure 7B:
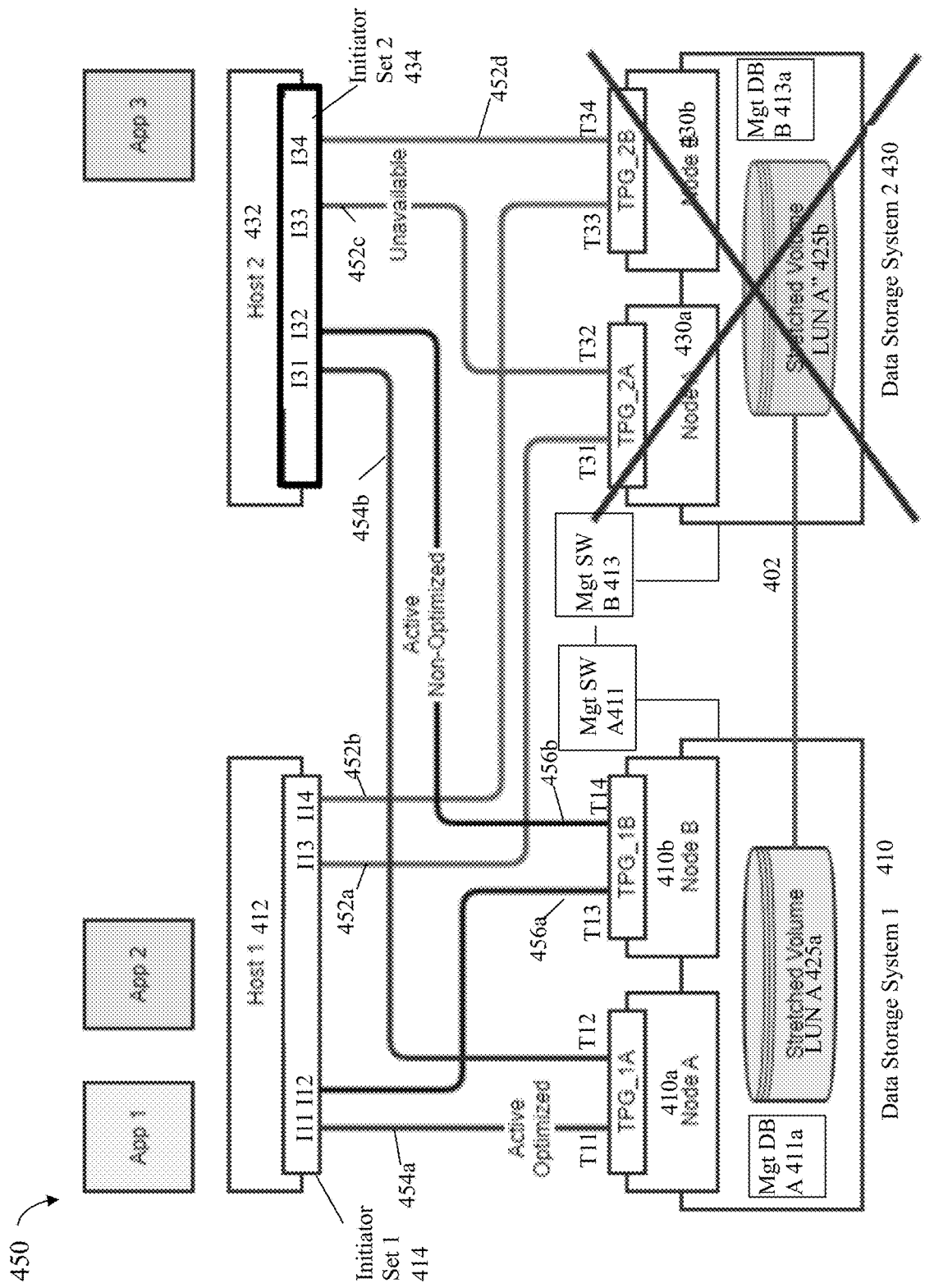

In at least one embodiment, processing may be performed consistent with discussion elsewhere herein where the data storage systems determine the ALUA path states, such as in connection with FIGS. 6, 7A and 7B, and expose or communicate such ALUA path states (also sometimes referred to herein access states) to the hosts. Thus, when the LUN is exposed to a host initiator over multiple paths (e.g., where the same LUN is accessible through multiple different target ports of the data storage system), the data storage systems may vary the associated access state of each such path in order to vary and control the particular ones of the multiple paths over which the host may issue I/Os to the LUN. In particular, processing may be performed by the data storage systems, such as the systems 410, 430 of FIGS. 7A and 7B, to determine which particular paths to the hosts 412, 432 are active optimized and which are active non-optimized at various points in time. The processing may include the data storage systems 410, 430 communicating the path states to the hosts 412, 432 and then also notifying the hosts 412, 432 when there are any changes to the path states, such as in response to a data storage system failure such as illustrated in FIG. 7B. In this manner, the hosts 412, 432 may select paths over which to send I/Os based on the particular ALUA path states or access states for particular volumes or LUNs as determined and communicated by the data storage systems 410, 430, where I/Os are sent by the hosts over those active-optimized paths.

Consistent with discussion herein such as in connection with FIGS. 5, 7A and 7B, a stretched volume or LUN is configured from a LUN or volume pair (R1, R2), where R1 and R2 are different instances of LUNs or volumes respectively on two data storage systems of the metro cluster. Further, the volumes R1 and R2 are configured to have the same identity and appear to a host as the same volume or LUN. Thus a volume or LUN on a first local data storage system may be characterized as stretched if that volume or LUN also has a matching counterpart remote volume or LUN on the other remote data storage system of the metro cluster pair.

In contrast to the stretched volume or LUN is an unstretched or non-stretched volume or LUN. A volume or LUN may be characterized as an unstretched volume or LUN existing on only one data storage system within the metro cluster pair.

An operation referred to herein as stretching a LUN or volume may be applied to an unstretched LUN or volume whereby a local unstretched volume or LUN on only one of the data storage systems of the metro cluster pair is converted to a stretched LUN or volume. Converting the unstretched volume or LUN of a first local data storage system of the metro cluster pair to a stretched volume may include creating a counterpart remote LUN on the second remote data storage system of the metro configuration. Consistent with other discussion herein regarding a stretched volume or LUN, from the external host perspective, the counterpart remote LUN is configured to have the same identity as the non-stretched LUN on the first data storage system. In connection with stretching an existing local unstretched LUN having the normal attribute, the local LUN has its attribute modified to stretched to denote a stretched volume.

In connection with stretching a LUN or creating a stretched LUN, such as creating the stretched LUN A or stretching the LUN A 425*a* resulting in the stretched LUN or volume configuration with the volumes 425*a* and 425*b* as illustrated in the FIG. 7A, ALUA path state changes may be made so that the host 1 412 local to the storage system 410 has one or more active optimized paths to the local stretched LUN copy 425*a* on the system 410 and one or more active non-optimized paths to the remote stretched LUN copy 425*b* on the system 430. Additionally, ALUA path state changes may be made so that the host 2 432 local to the storage system 430 has one or more active optimized paths to the local stretched LUN copy 425*b* on the system 430 and one or more active non-optimized paths to the remote stretched LUN copy 425*a* on the system 410. In some contexts as discussed herein, a LUN or volume and data storage system may be characterized as local with respect to a host if the host, LUN and data storage system are located in the same data center. Also in some contexts as discussed herein, a volume or LUN may be characterized as having local target ports and local TPGs over which the LUN is exposed to a host. In this case, such local ports and local TPGs may be characterized as local with respect to the LUN in that the LUN, local ports and local TPGs are all included in the same data storage system.

An unstretched volume or LUN of a data storage system included in a data center may be exposed to a host that is local to the data storage system whereby the host and the data storage system are included in the same data center. In this case in an embodiment in accordance with the ALUA standard, the unstretched volume is exposed to the host over at least one path from the data storage system to the host where the at least one path is active optimized. It should be noted that in some instances, under failure conditions, all active optimized paths may be off-line or unavailable whereby only active non-optimized paths remain as available. In this case, the active non-optimized path(s) may be used by the host.

Consistent with other discussion herein, depending on the data storage system implementation, only a single ALUA path within a local data center with respect to a host for a stretched volume may be active optimized such as illustrated in FIG. 7A. In contrast to the foregoing, alternatively, more than a single ALUA path within a local data center for a particular host may be active optimized for the stretched volume. However, in such embodiments consistent with other discussion herein, paths from a host to a remote data storage system and a remote data center for a remote copy of the stretched volume may be active non-optimized in order to make the host prefer to use local paths to the local copy of the stretched volume. It should be noted that while particular figures such as FIG. 7A may show just a single active optimized path for simplicity, in most real-life deployments, paths may between the host and a data storage system may have an associated access path state at the group level, such as based on a group of target ports as discussed elsewhere herein.

In connection with the data storage systems, or more particularly, the control path and management software of the data storage systems setting and modifying ALUA path states for exposed volumes or LUNs, the control path and management software of such systems may be configured with, and are aware of, the current topology of the metro cluster configuration. For example, the management software such as denoted by the elements 411 and 413 of FIGS. 7A and 7B know which hosts and data storage systems are local and included in the same data center, and which hosts and data storage systems are remote and included in different data centers. In this manner, the management software components 411, 413 respectively of the systems 410, 430 may communicate and cooperate to appropriately set ALUA path states and also ensure that both of the systems 410, 430 report the same information to the hosts 412, 432 for the exposed volumes or LUNs, such as the stretched LUN A configured from the volume pair 425a, 425b.

A stretched volume may be stretched between and among two data storage systems included in a metro cluster configuration as described elsewhere herein, for example, such as in FIGS. 5 and 7A. More generally, a volume or LUN may be stretched between and among more than two data storage systems included in a metro cluster configuration. For example, with reference to FIG. 7C, the stretched volume A is configured from a first volume R1 LUN A 425a on the system 410 and a second volume R2 LUN A" 425b on the system 430, where the volumes 425a and 425b are configured to have the same identity, "LUN A", as presented to one or more hosts (not shown for simplicity of illustration). As discussed above such as in connection with FIG. 7A, the volumes 425a-b may be configured for two way synchronous remote replication in order to synchronize the content of the volumes 425a-b to be mirrors of one another.

The foregoing concept of a stretched volume or LUN may be extended to a third data storage system, the data storage system 3 (DS3) 490, that may also be included in the same metro cluster configuration whereby a third volume R3, LUN A* 425c on the DS3 490 is also configured to have the same identity as the volumes 425a-b. In this manner, paths from the one or more hosts to the third volume R3 425c on the DS3 490 are similarly viewed as additional paths to the same stretched volume or LUN. In such an embodiment, the volumes 425b-c may be configured to have two way synchronous replication of writes in a manner similar to the volumes 425a-b. In at least one embodiment, processing may be performed to maintain mirrored identical content on the volumes 425a-c in a synchronous manner whereby writes applied to any one of the volumes 425a-c may also be applied in a synchronous manner to the remaining ones of the volumes 425a-c. For example, a write may be received at the system 410 for the stretched volume copy 425a. The write to the volume 425a may be synchronously replicated to the system 430 and applied to the volume 425b, and also synchronously replicated from the system 430 to the system 490 and applied to the volume 425c.

In at least one embodiment, an acknowledgement may not be returned to the host that sent the originating write to the system 410 until the system 410 receives an acknowledgement, directly or indirectly, that both the systems 430 and 490 have completed the write such as by storing the write data in caches of the systems 430, 490. The example 480 illustrates a daisy-chain like arrangement for the stretched volume configured from the volumes 425a-c with the same identity. In such an arrangement for synchronous replication, a write from a host may be received at the system 410. In response, the write may be synchronously replicated from the system 410 to the system 430. The system 430 receiving the write may then synchronously replicate the write from the system 430 to the system 490. In response to receiving the write, the system 490 may return a first acknowledgement to the system 430. In response to receiving the first acknowledgement, the system 430 may return a second acknowledgement to the system 410. In response to receiving the second acknowledgement, the system 410 may then return a third acknowledgement to the host regarding completion of the write operation. Receiving this second acknowledgement notifies the system 410 that the write has been successfully replicated and stored in the systems 430 and 490. Other arrangements and configurations of stretched volumes across more than 2 data storage systems are also possible. In such other arrangements and configurations, the original data storage system 410 receiving the host write may only return an acknowledgment to the host regarding completion of the received write once the system 410 receives an acknowledgment, directly or indirectly, that all systems configured in the stretched LUN or volume configuration, have received and stored the write in their respective systems.

In such embodiments, the stretched LUN or volume is generally configured from M volume instances on M different data storage systems in a metro cluster configuration, where the M volume instances are configured as identical volumes and recognized by the host as the same volume or LUN, and where M is equal to or greater than 2.

As discussed above, a stretched volume or LUN may be represented and configured as two or more volume or LUN instances located at different physical data storage systems. Generally, the two or more volume instances may be located in the same cluster or in different clusters.

A stretched LUN or volume may be used for any suitable purpose or application. For example, as discussed herein, a stretched volume or LUN may be included in a metro cluster configuration where the remote volume instance is used by a host in case of a disaster or data unavailability of the local copy of the stretched volume. A stretched LUN may also be used, for example, for volume migration between appliances or data storage systems in the same or possibly different clusters.

Generally, the multiple data storage systems including the multiple volume instances configured as the same stretched volume are synchronized in multiple aspects in order to have the multiple volume instances appear to the host as the same stretched volume or LUN. For example, as discussed above, data of the multiple volume instances configured as the same stretched volume or LUN is synchronized. In such implementations with a stretched LUN or volume exposed to the host over multiple paths from multiple data storage systems, the host may issue a read I/O command over any one of the multiple paths to read data from a target logical address of the stretched volume. In response, the host receives the same read data independent of the particular one of the multiple paths over which the host sends the read I/O. In a similar manner, a write I/O command issued over any one of the multiple paths to the stretched volume or LUN results in all multiple volume instances of the stretched volume being updated with the data written by the write I/O command.

In connection with a stretched volume or LUN, volume metadata (MD) also needs to be synchronized between all volume instances configured as the same stretched volume or LUN. The volume MD for a stretched LUN or volume may generally include information that may be reported to a host that requests such information about the stretched volume or LUN. Consistent with the SCSI standard as well as other standards, various management or control path commands may be issued by a host to a data storage system over a path over which the stretched LUN is exposed or visible to the host. In such implementations with a stretched LUN or volume exposed to the host over multiple paths from multiple data storage systems, the host may issue the management command requesting information included in the MD about the stretched volume over any one of the multiple paths. In response, the host receives the requested information. Further, the same set of information regarding the stretched volume is sent to the host independent of the particular one of the multiple paths over which the host sends the management command. Put another way, the host may send the management command requesting information about the stretched volume over any one of the multiple paths exposing the stretched volume, where the same set of information is returned to the host when the same management command is sent over any one of the multiple paths exposing the stretched LUN to the host. Additionally, any changes to the volume MD for the stretched volume made to one copy of the volume MD on one data storage system also need to be synchronized with any other copy of the volume MD stored on another data storage system. Thus, for example, a management command may be sent on a first path to a first data storage system, where the management command updates a first copy of the stretched volume MD of the first data storage system. Subsequently, the changes to the first copy of the stretched volume MD are also sent or applied to a second copy of the stretched volume MD of a second data storage system also exposing a configured instance of the stretched volume.

The volume MD may generally be included in management information stored in a management DB, such as the management (MGT) DBs 411*a-b* of FIG. 7A. In a system in accordance with the SCSI standard, the volume MD may include information regarding, for example, volume reservations, ALUA path states for paths over which the stretched volume is exposed to the host, the particular target ports and TPGs over which the stretched LUN is exposed to the host, and other information that may vary with embodiment.

Developing and testing stretch volume synchronization between volume instances is expensive because running a test requires several physical data storage systems to allocate several different instances of the stretched volume. Test scenarios may be time consuming as well as difficult and erroneous to configure. For example, it may take an undesirable amount of time with many steps to configure the multiple copies or instances of the stretched volume at all the data storage systems. Furthermore, such configuration may require the management or control planes of all such systems to appropriately communicate with one another. Additionally, the multiple instances of the stretched volume are configured for data replication as well as any required synchronization of management information, such as the volume MD.

Thus configuration of a stretched volume across multiple data storage systems may be characterized as time consuming, difficult and potentially erroneous. Additional system resources are also used to maintain the required synchronization, such as for data replication and synchronization of volume MD or management information regarding the stretched volume or LUN. Furthermore, additional configuration may be required to test the various scenarios desired for the stretched volume or LUN.

In connection with configuring and testing stretched volume scenarios and uses, two different physical storage systems may be used as noted above having the drawbacks and complexities noted above. As a variation, the two or more different storage systems including the multiple instances configured as the same stretched volume may be virtualized. For example, the two data storage systems may be running as two virtualized data storage systems in containers or virtual machines. However, this latter virtualized approach requires further logic to manage the containers or virtual machines that further increases the configuration complexity and may further decrease performance.

The foregoing complexities and drawbacks encountered when configuring, running and validating stretched volume scenarios may result in decreased productivity and delays in connection with feature development and testing regarding stretched volume configurations.

Described in the following paragraphs are techniques that may be used to simplify stretched volume development and testing by simulating a stretched volume or LUN configuration. In at least one embodiment, the stretched volume or LUN may be configured from two copies or volume instances including a regular or normal volume, and a shadow volume. The regular and shadow volumes may be included in the same single data storage system operating in a simulation mode to simulate the stretched volume. The regular volume and the shadow volume configured as the simulated stretched volume may be exposed to, and viewed by a host, as a same logical volume over paths from the single data storage system. In such an embodiment, the techniques provide for creating a pair of volumes in the same single data storage system or appliance to represent the local and remote volume instances configured as the same stretched volume or LUN. The pair of volumes on the same system may be linked to each other in connection with a simulation mode.

In at least one embodiment, the target ports of the single data storage system simulating the stretched volume may be partitioned into two groups. If a management command is received at a first of the two groups, the command is assumed to be directed to the regular or normal volume representing the local volume instance of the stretched volume. If a management command is received at a second of the two groups, the command is assumed to be directed to a shadow volume representing the remote volume instance or shadow volume of the stretched volume.

Generally, the data storage system does not allow creating or configuring the identical volumes as used in connection with the stretched volume or LUN. As such, in at least one embodiment, the techniques herein use different unique identifiers (UIDs) as the LUN IDs for the different volume instances of the simulated stretched volume. A simulation mode for simulating the stretched volume in the single system includes a conversion algorithm and component that maps or switches between the different UIDs linked to the same stretched volume. In at least one embodiment in accordance with the SCSI standard, the UIDs may be WWNs, where a first WWN may be used to identify the regular volume and a second different WWN may be used to identify the shadow volume. The data storage system running in simulation mode links the foregoing first and second WWNs together and associates them both with the same stretched volume or LUN. A component, such as a UID switching logic or component, may be used to map the first WWN to the second WWN, and also map the second WWN to the first WWN as may be needed in connection with simulating the stretched volume configuration when processing management commands.

In at least one embodiment, the first WWN or other LUN ID associated with the regular volume may be exposed to the host as the LUN ID of the simulated stretched volume configured from the regular volume and its associated counterpart shadow volume.

The foregoing and other aspects of the techniques herein are described in more detail in the following paragraphs.

In the following paragraphs, the techniques herein may refer to a SCSI based protocol, such as FC or iSCSI. However, the stretched volume and the techniques described in the following paragraphs may also be used in embodiments using other suitable protocols such as, for example, NVMe.

In the following paragraphs, illustrative examples are provided in which a stretched volume is configured from two volumes—a regular or normal volume and a shadow volume. More generally, the techniques herein may be further extended for use with a stretched volume configured from any suitable number of configured volumes, M, on M different data storage systems or appliances, where M is equal to or greater than 2. Note that this follows from the generalization of a stretched volume or LUN configuration as described elsewhere herein such as, for example, in connection with FIG. 7C. In such embodiments, the stretched volume or LUN may be simulated using the regular or normal volume as described herein along with M−1 shadow volumes in the single data storage system. Also, in such an embodiment, the total number of target ports of the single data storage system may be divided into M groups or partitions, where a different one of the M groups or partitions is associated with a particular one of the M configured volumes for the stretched volume. In this manner, each of the M groups or partitions of target ports may be used to simulate paths from the host to one of the M data storage systems or appliances including one of the M volumes configured for the simulated stretched volume.

In the following paragraphs, the techniques are described in embodiments in which a particular ALUA path state for a particular volume or LUN is applied at the TPG level of granularity where all target ports in the same TPG have the same ALUA path state. In this case, all target ports in the TPG over which a volume or LUN is exposed acquire the TPG ALUA path state. For example, setting a TPG to active optimized for an exposed LUN accordingly sets all target ports in the TPG to active optimized for the exposed LUN. As another example, setting a TPG to active non optimized for the exposed LUN accordingly sets all target ports in the TPG to active non optimized for the exposed LUN. As a variation as also illustrated herein such as in connection with FIGS. 7A and 7B, ALUA access path states may be set individually on a per path basis rather than at a TPG level. More generally, the techniques herein may be used in connection with embodiments which do not utilize ALUA and do not utilize ALUA path states.

The techniques described in the following paragraphs may be used to simulate a stretched volume or LUN that may be used in any suitable application some of which are described herein. For example, the techniques described in the following paragraphs may be used to simulate and test a stretched volume configuration that may be used in a metro cluster configuration or a metro configuration. The techniques herein may be used to simulate and test a stretched volume configuration as described in connection with FIGS. 7A and 7B where, for example, the ALUA access path states change to simulate a disaster at a local or primary data storage system. As another example, the techniques herein may be used to simulate and test a stretched volume configuration that may be used in connection with migrating data of the stretched volume from a first instance or volume to a second instance or volume. The migration may be performed, for example, in connection with load balancing to relocate and migrate a volume between a simulated local system and simulated remote system.

Before further describing embodiments of the techniques herein for simulating the stretched volume, presented is an initial discussion of information that may be included in volume MD (in some contexts sometimes referred to herein as simply MD) as well as various commands that may be used in connection with querying and modifying the volume MD. Examples in the following paragraphs may be in accordance with a particular protocol and standard, such as the SCSI protocol and standard. However, other suitable protocols and standards, such as NVMe, may be used in connection with the techniques herein, wherein such other protocols and standard may have similar concepts, commands and information included in volume MD.

One example of volume MD includes SCSI reservation and registration information. For example, SCSI-2 and SCSI-3 are versions of the SCSI standard that support device registrations and reservations and have various commands that perform operations affecting device registrations and reservations. For example, SCSI-3 has persistent reservation (PR) commands. Commands used in connection with reservation and registration information may include commands that, for example, perform a registration, read information regarding existing registrations, perform a reservation, perform a clear operation to clear a reservation, perform a release to release a reservation, and perform processing to preempt a reservation.

SCSI PR uses the concepts of registrations and reservations. PRs allow multiple hosts, or more generally multiple initiators, to communicate with a target by tracking multiple initiator-to-target relationships called I_T nexuses. An I_T nexus is a relationship between a specific SCSI initiator port (I) and a specific SCSI target port (T) for a given LUN within the SCSI target. It should be noted that following examples may refer to SCSI PR commands such as in a SCSI-3 based system. However, similar commands and/or operations may be performed in other embodiments based on other versions of the SCSI standard which also affect reservation state information.

As a first step in setting up a PR, registration may be performed using Reservation Key, also more generally referred to herein as simply a "key". A key may generally be any suitable value, such as a numeric value. Each host system that participates registers a key with each volume or LUN over each path (e.g., each initiator (I) and target port (T) pairing) over which each particular volume or LUN is accessible to the host. For example, with reference to FIG. 7A, the stretched LUN A may be exposed to the host 1 412 over the 4 paths: I11-T11 422a, I12-T13 324a, I13-T31 423b, and I14-T33 423c, where the host 412 may register its key, K1, over each of the foregoing 4 paths to access the stretched LUN A. In a similar manner, the stretched LUN A may be exposed to the host 2 432 over the 4 paths: I31-T12 423d, I32-T14 423e, I33-T32 422b and I34-T34 423f, where the host 432 may register its key, K2, over each of the foregoing 4 paths to access the stretched LUN A. Although each of the hosts 412, 432 are described for illustration purposes as using different keys, more generally, hosts may use the same or different keys. In such a system where each host registers with a different key over all its own paths to the same LUN, all registrations having the same key may denote all paths from a particular host to the LUN.

As a result of the hosts 412, 432 each registering their respective keys over their respective 4 paths noted above, the data storage system 410 may include the following first set of registration information for the stretched volume or LUN A of Table 1, and the data storage system 430 may include the following second set of registration information for the stretched volume or LUN A of Table 2:

TABLE 1

Registration information for LUN A
on the data storage system 410

| Volume/LUN | Key | Init ID | Target ID |
|---|---|---|---|
| A | K1 | I11 | T11 |
| A | K1 | I12 | T13 |
| A | K2 | I31 | T12 |
| A | K2 | I32 | T14 |

TABLE 2

Registration information for LUN A
on the data storage system 430

| Volume/LUN | Key | Init ID | Target ID |
|---|---|---|---|
| A | K1 | I13 | T31 |
| A | K1 | I14 | T33 |
| A | K2 | I33 | T32 |
| A | K2 | I34 | T34 |

Processing may be performed to synchronize the volume MD for the stretched LUN A where the information of Table 1 is sent from the system 410 to the system 430, whereby the system 430 updates the volume MD for the stretched LUN A to include a combination of the information of the Tables 1 and 2. Processing may be performed to synchronize the volume MD for the stretched LUN A where the information of Table 2 is sent from the system 430 to the system 410, whereby the system 410 updates the volume MD for the stretched LUN A to include a combination of the information of the Tables 1 and 2.

As a result of the volume MD synchronization, the collective registration information for the stretched volume or LUN A as stored in each of the MGT DBs 411a-b, respectively, of the systems 410, and 430 may include the following information as in the Table 3 below:

TABLE 3

| Row # | Volume/LUN | Key | Init ID | Target ID |
|---|---|---|---|---|
| 1 | A | K1 | I11 | T11 |
| 2 | A | K1 | I12 | T13 |
| 3 | A | K1 | I13 | T31 |
| 4 | A | K1 | I14 | T33 |
| 5 | A | K2 | I31 | T12 |
| 6 | A | K2 | I32 | T14 |
| 7 | A | K2 | I33 | T32 |
| 8 | A | K2 | I34 | T34 |

In at least one embodiment, registration of the PR keys as illustrated in the Tables 1, 2 and 3 may be performed by the hosts 412, 432 as part of discovery processing whereby various devices and connections visible or accessible to the hosts are discovered. As part of host discovery processing, each of the hosts may register a key for each LUN accessible to the host over each path which the LUN is accessible. In an embodiment in which each host uses its own set of one or more keys, a Reservation Key may be registered for each I_T nexus (each I-T over which a LUN is accessible to the initiator I) and includes the necessary information to allow the authentication of the I_T nexus devices in order to control the reservations.

The information in Table 3 may denote the aggregated or collective set of registration information included in the volume MD for the LUN A.

An embodiment in accordance with techniques herein may provide support for the PR IN command to read or query registration and reservation information included in the volume MD of the MGT DBs 411-b. It should be noted that an embodiment may include different command parameters with the PR IN command to request and vary the particular information provided and returned to the requesting initiator. For example, a PR IN command may include one or more parameters identifying the particular information to be returned. For example, the PR IN command may include one or more parameters requesting to return a complete set of all registration and reservation information of the databases, return only reservation information, return only registration (e.g., key information), return only registration and/or reservation information associated with a particular key, and the like. To further illustrate, assume subsequent to issuing the 4 PR registration commands, the host 412 issues a PR IN command over the path I11-T11 422a to the system 410 requesting a list of all existing or active registrations and reservations with respect to a particular LUN, such as the stretched volume or LUN A. Generally, the PR IN command is directed to a particular LUN and issued over one of the paths (from initiator to a target port) for which there is an existing registration for the LUN. In response to receiving the PR IN command over the path 422a for the volume or LUN A, the system 410 may query its MG DB A 411a for the requested reservation and registration information of the volume MD for the stretched volume or LUN A. In response to the PR IN command, the system 410 may return the information as described above in Table 3. In a similar manner, issuing the same PR IN command regarding LUN A over any of the 8 paths to the systems 410, 430 also results in returning the same information as described in Table 3. It should be noted that if there were also existing reservations (described elsewhere herein) with respect to LUN A, then information regarding such existing reservations may also be returned in response to the PR IN command described above.

In this manner, the requesting host 412 or initiator I11 may be presented with a complete view of registration and reservation information with respect to all paths to the stretched volume or LUN A across both systems 410, 430 by issuing the PR IN command directed to LUN A over any of the 8 active paths exposing the stretched LUN A and behave as if the 8 active paths to the stretched volume or LUN A are all on the same data storage system. This is consistent with discussion elsewhere herein where the host 412 has a view that the paths 422a, 423a, 423b and 423c are 4 active paths to the same volume or LUN A, and where the host 432 has a view that the paths 423d, 423e, 422b and 423f are 4 active paths to the same volume or LUN A even though there are both primary and secondary copies 425a-b of the stretched volume or LUN A configured in the metro cluster configuration on the two different data storage systems 410, 430.

Commands affecting or related to registrations and reservations, such as various ones of the PR commands, affect the ability of initiators and thus hosts to perform I/O with respect to different LUNs. For example, in connection with registrations with the SCSI standard, if there is no registration with respect to a particular I-T nexus (e.g., initiator and target port for a particular LUN), that initiator may at most be able to have read-only access to data of that LUN over the path from the initiator to the target port. As described below in more detail, an initiator may also issue other commands, such as a reservation command, which request a particular type of volume or LUN access and may block or modify access allowed by other initiators and hosts. Such other commands described in more detail in the following paragraphs may result in modifying or updating existing volume MD, such as for the stretched LUN A, whereby such modifications may also be synchronized among the systems 410, 430 of the metro cluster configuration hosting copies 425a-b of the stretched LUN A.

In at least one embodiment in accordance with the SCSI standard, a PR reserve or reservation command may be issued over a path from a particular initiator to a particular target port and directed to a LUN (e.g. PR reservation may be made with respect to a particular LUN, initiator and target port). Additionally, the PR reserve or reservation command may include parameters such as, for example, a parameter that denotes a key of a previous PR registration, a parameter identifying an associated type of I/O access for the requested reservation, and possibly other parameters. For example, the type of I/O access parameter may be one of variety of different types of I/O access such as exclusive access (whereby no other initiator besides the current reservation holder having the exclusive access is allowed to issue any I/Os to the LUN), write exclusive access (whereby only the initiator holding the current reservation is allowed to issue writes but other initiators may issue read I/Os), and the like. In at least one embodiment in accordance with the SCSI standard, the PR reservation command may be included in the broader category of PR OUT commands that generally change or modify volume MD associated with a particular volume or LUN.

To further illustrate, assume that the initiator I11 of the host 412 issues a PR reservation command for the stretched LUN A over the path I11-T11 422a, where the PR reservation command requests write exclusive access so that only the initiator I11 holding the current reservation is allowed to issue writes but other initiators may issue read I/Os. In response to receiving the foregoing PR reservation command, the system 410 may update the volume MD for the stretched LUN A as included in the MGT DB A 411a to also include an existing reservation for I11 for write exclusive access. Additionally, processing may be performed to synchronize the volume MD for the LUN A of the MGT DB 411a of the system 410 with corresponding volume MD for the LUN A in the MGT DB 411b of the system 430. For example, the system 410 may send the reservation for I11 for write exclusive access for LUN A to the system 430, whereby the system 430 may accordingly update its local copy of the volume MD for the LUN A in the MGT DB 411b. Subsequently, an acknowledgement or response may be returned from the system 430 to the system 410, and then from the system 410 to the initiator I11 of the host 412, where the acknowledgement or response indicates success-ful completion of the PR reservation command requesting a reservation for I11 for write exclusive access to the LUN A.

Thus, in this manner, reservations from the data storage system 410 (receiving the PR reservation command) may be mirrored on the remote data storage system 430 in an atomic manner. Receiving a reservation on one path over which LUN A is accessible through a first data storage system results in replicating the reservation state across all paths over which LUN A is accessible through a second data storage system. Once the reservation exclusive write access for I11 to the LUN A completed as described above, a subsequent write I/O, such as from the host 432 over any of the paths 432d, 432e, 422b and 423f may result in an error due to the existing reservation for the LUN A for the initiator I11.

In at least one embodiment in accordance with the SCSI standard, other commands that may modify volume MD may include a clear command that is a sub-command of the PROUT command and may be issued to a particular LUN to release or clear the persistent reservation (if any) and clear registrations for the particular LUN. In a similar manner as discussed herein in connection with other management commands that modify the volume MD of the stretched volume or LUN A, any reservations and registrations of the LUN A cleared on one of the systems 410, 430 (e.g., receiving the PR clear command) may be mirrored on the other remote one of the system 410, 430 in order to synchronize the volume MD for the LUN A across both systems 410, 430. Generally, depending on the particular embodiment, other parameters and criteria may be specified in connection with the clear command that affect the particular registrations and/or reservations cleared or removed for the LUN A.

In at least one embodiment in accordance with the SCSI standard, other commands that may modify volume MD may include a release command that releases any active persistent reservation but does not remove the registrations for a particular LUN. In connection with the SCSI-3 standard, the release command is a sub-command of the PROUT command and is issued to a particular LUN to release or clear the persistent reservation (if any) from the LUN. In a similar manner as discussed herein in connection with other management commands that modify the volume MD of the stretched volume or LUN A, any reservations of the LUN A released on one of the systems 410, 430 (e.g., receiving the PR release command) may be mirrored on the other remote one of the system 410, 430 in order to synchronize the volume MD for the LUN A across both systems 410, 430. Generally, depending on the particular embodiment, other parameters and criteria may be specified in connection with the release command that affect the particular registrations and/or reservations cleared or removed for the LUN A.

The foregoing are examples of some management commands in connection with the SCSI protocol and standard that may be used in connection with the stretched volume or LUN, such as the LUN A. More generally, other management commands may be supported and the particular examples provided herein are illustrative and not meant to be limiting.

As a further example of volume MD such as for the stretched LUN A, consider an embodiment in accordance with the ALUA standard utilizing the ALUA path states or access path states as described herein. The particular ALUA path states with respect to a particular volume or LUN may be included in volume MD for the volume or LUN. For example, the information in the tables 310 and 320 of FIG. 6 may be included in the volume MD for the particular exposed LUNs at different points in time. As another example, the particular path states as described in connection with the FIGS. 7A and 7B may be included in the volume MD for the stretched LUN A at different points in time. In connection with the stretched LUN A of FIGS. 7A and 7B, the path state information regarding the paths over which LUN A is exposed may be synchronized across the systems 410 and 430. For example, any path state changes made by the system 410 regarding a path including any of the target ports T11-T14 may be communicated to the system 430 so that both the system 410 and 430 may have copies of the same set of ALUA path state information for the 8 paths over which the stretched LUN A is exposed to the hosts 412, 432.

In at least one embodiment in accordance with the SCSI standard, management commands such as a report target port group (RTPG) command and an inquiry command may be issued by any of the hosts 412, 432 to return information regarding a particular LUN, such as the stretched LUN A configured from the volumes 425*a-b* in the metro cluster configuration. In at least one embodiment, commands such as the foregoing issued by the hosts 412, 432 to the data storage systems 410, 430 may result in reporting information about the requested LUN A. The information returned and reported may identify the existing paths and associated ALUA path states, TPGs and target ports over which the LUN A (e.g., volumes 425*a-b*) is exposed to the hosts 412, 432. The information returned in response to the RTPG command is generally described elsewhere herein, for example, such as in connection with the FIGS. 7A and 7B above. In at least one embodiment, the information reported or returned in response to such commands may omit any TPG and target ports for which there is no path (e.g., unavailable status) to the LUN A. The RTPG command requesting information about LUN A may be issued to the systems 410, 430 over any of the paths over which the LUN A is exposed to the hosts 412, 432. In response, the systems 410, 430 return the same set of collective information in response to a RTPG for LUN A issued over any of the paths exposing LUN A. The set of collective information returned over any of the paths exposing LUN A may include the target ports exposing LUN A, target port groups exposing LUN A, and ALUA path states for paths exposing LUN A.

The foregoing generally describes some of the management commands that may be issued in connection with a stretched LUN or volume configuration. In at least one embodiment in accordance with the techniques herein, the foregoing management commands as well as others may also be issued and processed using the simulated stretched volume or LUN. In this manner, the simulated stretched volume or LUN described in more detail below may be used in testing and development of the management commands.

In at least one embodiment in accordance with the techniques herein, the simulated stretched volume or LUN may be used in testing and development of volume MD synchronization for management commands.

In at least one embodiment, stretched volume development and testing may be performed using a simulated stretched volume or LUN created from a pair of volume objects in the same data storage system. The pair of volume objects may represent, respectively, the local and remote portions of the stretched volume as two LUNs or volumes that are linked to one another in simulation mode.

In at least one embodiment, one of the volumes of the pair may be selected for processing a management command depending on the particular target port selected by a host initiating the management command. In at least one embodiment, the management command may be any of the management commands described herein as well as others that may be supported in connection with the simulated stretche In at least one embodiment, the MGT DB of the single data storage system may store volume MD for each volume or LUN of the system. In connection with the simulated stretched volume represented by the pair of volumes, the MGT DB may include an individual record or entry for each of the volumes of the pair. A first volume V1 of the pair may be a normal or regular volume corresponding to the local copy of the stretched volume on the local data storage system. A second volume V2 of the pair may be a shadow volume corresponding to the remote copy of the stretched volume on the remote data storage system. The MGT DB may store a first entry or record for V1, and a separate second entry or record for V2 thereby separating the local and remote metadata of the stretched volume.

In at least one embodiment, for each simulated stretched volume, a normal or regular volume V1 may be created having an identity or LUN ID, such as a WWN in accordance with the SCSI protocol, that is exposed to the external host(s). Additionally, for each simulated stretched volume, a shadow volume V2 is also created. The different copies of the volume MD for V1 and V2 may be maintained using the separate entries or records of the MGT DB associated with each of the volumes V1 and V2. The host may view both the regular volume V1 exposed over a first path and the shadow volume V2 exposed over a second path as the same LUN or volume having the same identity, such as the same WWN.

In at least one embodiment, V1 may have a first identifier, such as a first WWN, used to uniquely identify V1 with respect to all other volumes or LUNs. V2 may have a second identifier, such as second WWN, used to uniquely identify V2 with respect to all other volumes or LUNs. In at least one embodiment, the first identifier may be used as an index into a table of the MGT DB to obtain a first entry or record including volume MD for V1, and the second identifier may be used as an index into a table of the MGT DB to obtain a second entry or record including volume MD for V2. In at least one embodiment, the contents of the first and second entries or records may be the same other than the different LUN IDs, such as the different WWNs, assigned to V1 and V2. In at least one embodiment in accordance with the SCSI standard, the host may view the regular volume and the shadow volume as having the same identity, such as having the same first identifier such as the first WWN.

In at least one embodiment, the target ports of the single data storage system may be partitioned into two logical groups for simulating paths, respectively, to the local and remote data storage systems, where the management commands may be issued over such paths.

In at least one embodiment, a UID switching logic or component (sometimes referred to herein as a UID switch) may be used to map between the different LUN IDs, such as the different WWNs, associated with the normal or regular and shadow volumes of the stretched volume. In at least one embodiment as noted above, the regular volume may have the first WWN and the shadow volume may have the second WWN different from the first WWN. The regular volume exposed over a first path and the shadow volume exposed over a second path may both be presented to the host as the same stretched logical volume having the same identity, such as, for example, where both the regular and shadow volumes have the first WWN. When the host issues a first management command over the first path to a first target port in a first partition of target ports of a data storage system where the first management command is directed to the simulated stretched volume with the first WWN, the data storage system simulates the local data storage system servicing the first management command. When the host issues a second management command over the second path to a second target port in a second partition of target ports of the data storage system where the second management command is directed to the simulated stretched volume with the first WWN, the data storage system simulates the remote data storage system servicing the second management command.

In at least one embodiment, the regular or normal volume of the pair of volumes used to simulate the stretched volume may be used for servicing I/O commands, such as read and write commands that, respectively, read data from and write data to the stretched volume.

In at least one embodiment, the normal or regular volume V1 simulates the stretched volume copy in the local data storage system, and the shadow volume V2 simulates the stretched volume copy in the remote data storage system.

Figure 8:
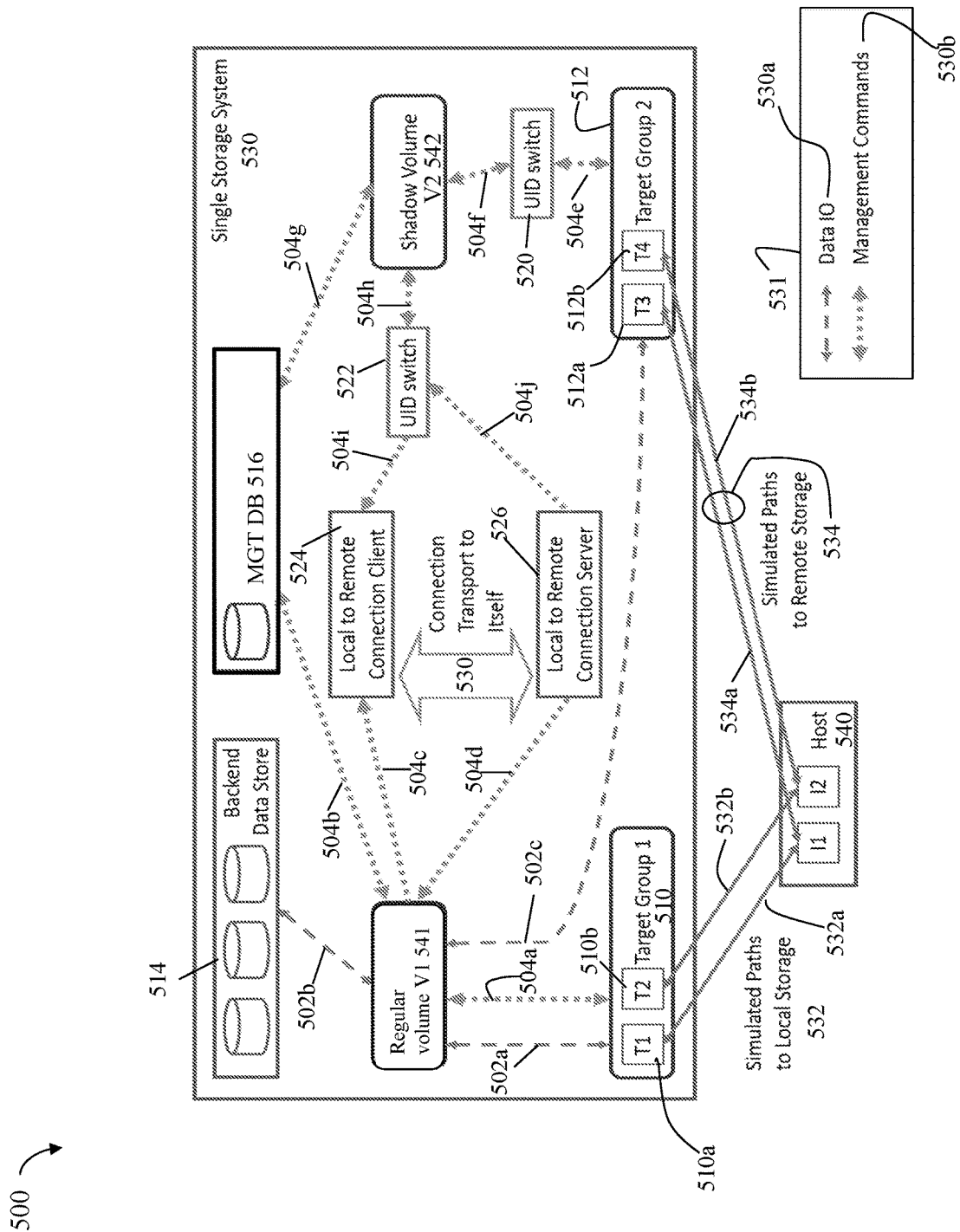
FIG. 8 is an example of illustrating components and data flow in connection with processing commands with a simulated stretched volume in at least one embodiment in accordance with the techniques herein.

Referring to FIG. 8, shown is an example 500 of the components and data flow in at least one embodiment in accordance with the techniques herein. The example 500 includes a single data storage system 530 and a host 540. The system 530 may be, for example, a dual node appliance or data storage system described elsewhere herein such as illustrated in FIG. 2. The host 540 may be a host including other components as described herein.

The example 500 illustrates an example of a simulated stretched volume or LUN configured using the regular volume V1 541 and the shadow volume V2 542. As discussed elsewhere herein, the volume V1 represents the copy of the stretched volume on the local data storage system, and the volume V2 represents the copy of the stretched volume on the remote data storage system.

The example 500 includes a BE data store 514 corresponding to the BE PDs of the data storage system 530. Consistent with other discussion herein, the BE data store 514 may include the PDs used to provide BE non-volatile storage for the volumes or LUNs of the system 530. The MGT DB 516 may include information used in connection with the management commands. The MGT DB 516 may include, for example, data storage system configuration information and volume MD for the volumes or LUNs of the system 530.

In this example 500, the system 530 is illustrated as including only the TPGs 510, 512, where the TPG 510 includes the target ports T1 510a and T2 510b, and where the TPG 512 includes the target ports T3 512a and T4 512b. In this example, the TPG 510 may denote the target ports of the node A of the system 530, and the TPG 512 may denote the target ports of the node B of the system 530. More generally, the system 530 may include any suitable number of TPGs each with any suitable number of target ports. The host 540 includes the initiators I1 and I2. More generally, the host 540 may include any suitable number of initiators. In the example 500, there are following 4 paths from the host 540 to the system 530: the path I1-T1 532a, the path I2-T2 532b, the path I1-T3 534a, and the path I2-T4 534b.

The element 531 denotes a key of various data flow arrows or paths within the system 530, where the dashed line paths 502a-c denote portions of the processing flow in connection with the I/O or data path 530a. The dotted line paths 504a-j denote portions of the processing flow in connection with the management or control path 530b when processing a management command.

Collectively, the target ports of the TPGs 510 and 512 may denote the partitioning of all the target ports of the system 530 into two logical groups. The TPG 510 may represent the simulated target ports of the local data storage system. The paths 532a-b to the TPG 510 may denote the simulated paths 532 to the local data storage system. The TPG 512 may represent the simulated target ports of the remote data storage system. The paths 534a-b to the TPG 512 may denote the simulated paths 534 to the remote data storage system.

The UID switches 520, 522 may denote switching logic of components that map between the various UIDs of the volumes linked to the same simulated stretched volume. For example, consistent with discussion above, the UID switches 520, 522 may take as an input a first UID and map the first UID to a second UID, where the first UID and the second UID may be UIDs or unique LUN IDs, such as WWNs, associated with V1 and V2. In this particular example, the UID switches 520, 522 generally toggle between the two different UIDs. In other words, if a UID switch instance is provided the WWN1 or UID of V1, then the UID switch instance outputs the WWN2 or UID of V2. Similarly, if a UID switch instance is provided the WWN2 or UID of V2, then the UID switch instance outputs the WWN1 or UID of V1.

The elements 524, 530 and 526 generally represent a simulated connection between the simulated local and remote storage systems. Consistent with other discussion herein, stretched volume logic assumes a communication connection between the local and remote systems. The connection may be used in a metro cluster configuration to also synchronize management data such as the volume MD. In this manner when in non-simulation mode, the connection may be used to synchronized volume MD and possibly other management information maintained on the local and remote system for a stretched volume. In simulation mode, the connection between the local and remote systems may be configured as illustrated in FIG. 8 as a loopback to the single data storage system 530 to simulate the connection between the local and remote systems. In other words, in similar mode, the source system and the destination or target system of the connection are the same single data storage system 530. The connection denoted by 524, 530 and 536 may be used to simulate synchronize volume MD, for example, where a management command modifies volume MD of the stretched volume. In one aspect as discussed in more detail below, the connection denoted by 524, 530 and 526 may be used to simulated replicating the management command between local and remote data storage systems.

In at least one embodiment, a volume creation operation may be performed to create a simulated stretched volume. Creating the simulated stretched volume in this example creates a regular volume object and additionally creates a shadow volume object. The regular volume object represents the volume and its metadata if the system 530 simulates (e.g., plays the role of) the local data storage system for management command processing. The shadow volume object represents the remote copy of the same volume and its metadata if the system 530 simulates (e.g., plays the role of) the remote data storage system for management command processing. The element 541 denote the regular volume V1, and the element 542 may represent the shadow volume V2.

In at least one embodiment, the storage system 530 may not allow creating two volumes, such as the regular volume V1 and the shadow volume V2, with the same UID, such as the same WWN. For this reason, the regular volume V1 may be configured with a first UID such as the first WWN, and the shadow volume may be configured with a different second UID, such as the second WWN. For purposes of illustration, assume that the regular volume V1 is configured with a WWN1=15 and the shadow volume V2 is configured with a WWN2=16. The simulation mode implements a conversion algorithm in the UID switches 520, 522, to map or switch from the normal volume UID to the shadow volume UID, and also to map or switch from the shadow volume UID to the normal volume UID. The use of the UID switches facilitates mapping between the different UIDs of the shadow and regular volumes. For example, as discussed in more detail below, a host may provide the UID such as the WWN1=15 in a management command and the UID switch may be used to map the WWN1=15 to WWN2=16, the remote counterpart shadow volume's UID.

In at least one embodiment, the targets representing a volume connection to a host may be partitioned into 2 groups. For example, the targets may be the target ports of the system 530. If the host issues a management command (e.g., a SCSI or NVMe reservation command, a LUN reset command, or a target reset command) to a target from the first group 510 then the command is considered as a command to a first local data storage system processed by normal volume/normal volume object. If the host uses a target from the second group 512, then the command is considered as a command to a second remote data storage system and processed by shadow volume/shadow volume object.

The stretched volume logic assumes communication between local and remote systems to synchronize volume MD between the systems. In simulation mode, the local to remote connection of the system 530 is configured as a connection or loopback to the system 530, where the source and destinations of the connection are both on the system 530. Using the loopback connection when in the simulation mode, any metadata synchronization command sent over the connection is received by the same system 530. The UID switch logic selects the normal or shadow volume object to process the management command depending on the role (e.g., local or remote) when processing the command.

In at least one embodiment, all I/O commands of the data or I/O path may be processed by the regular volume independently of the particular target used for the command. This avoids synchronization or replication of data between the normal and shadow volumes since the same backend data storage of the regular volume 541 is used for servicing I/O commands when the system 530 simulates both the local and remote system roles. In such an embodiment, simulator mode overhead may be minimized resulting in increased performance.

Continuing with the example above, assume that the regular volume V1 541 is configured with a first UID of WWN1=15, and the shadow volume V2 542 is configured with a second UID WWN2=16. In at least one embodiment, the volumes V1 and V2 may be presented and exposed to the host 540 over the paths 532a-b and 534a-b as the same stretched volume or LUN having the same WWN1=15. The host 540 may issue management commands over any of the paths 532a-b, 534a-b using the WWN1=15. For example, the host 540 may issue a management command such as RTPGs over any of the paths 532a-b, 534a-b requesting information for the stretched volume with the UID or WWN1=15 and receive the same set of information in return.

Figure 9A:
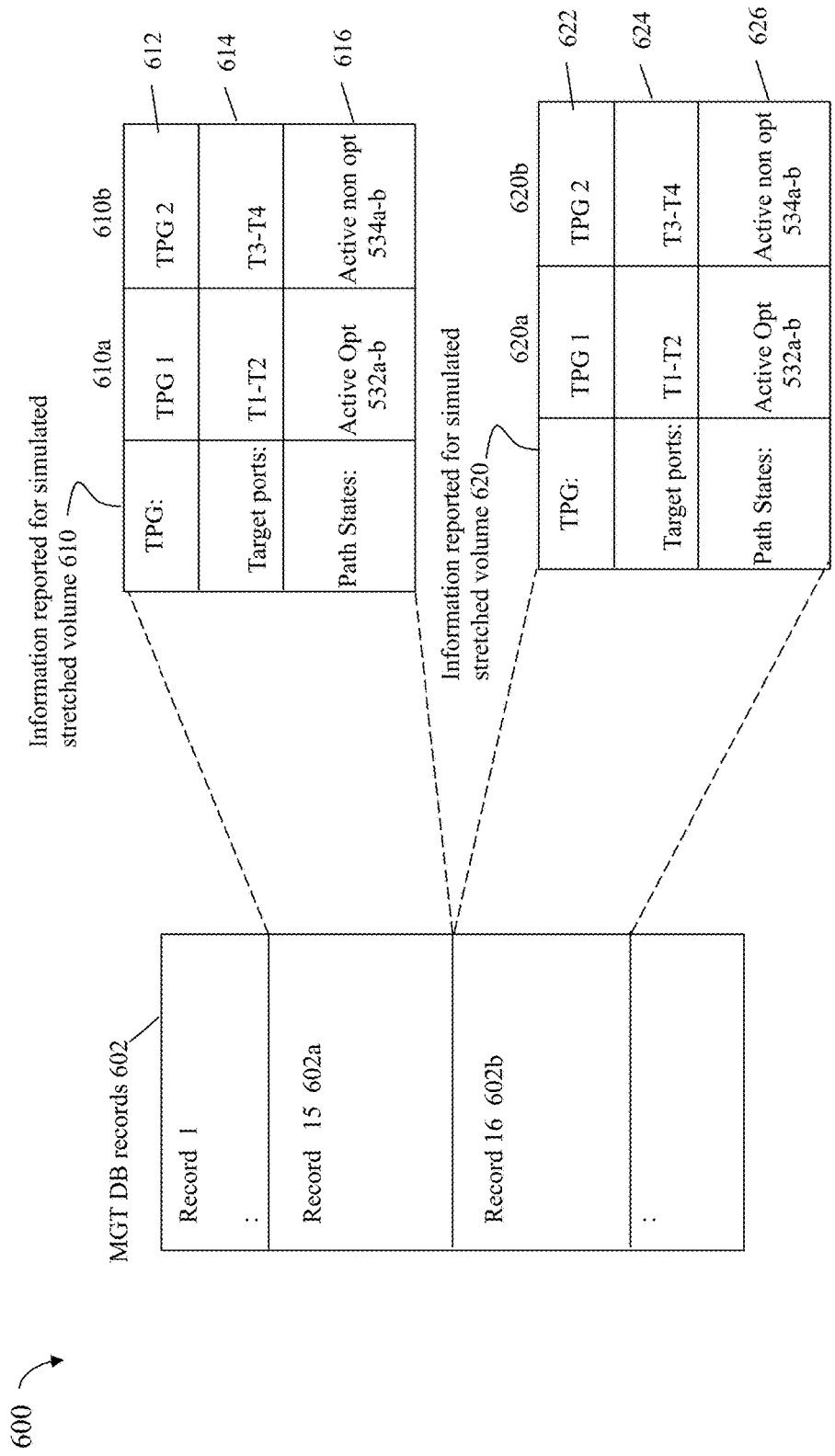
FIGS. 9A and 9B are examples of volume metadata that may be used in connection with a simulated stretched volume in at least one embodiment in accordance with the techniques herein.

In at least one embodiment, the MGT DB 516 may include a table or other structure of information regarding existing volumes or LUNs indexed by the UIDs, such as the WWNs, of the volumes. For example, reference is made to the example 600 of FIG. 9A where the MGT DB 516 may include MGT DB records 602, comprising a first entry or record of MD 602a for the regular volume V1 that is indexed by the WWN1=15 identifying the regular volume, and a second entry or record of MD 602b for the shadow volume V2 that is indexed by the WWN2=16 identifying the shadow volume.

The table 610 illustrates in more detail information that may be included in the record 602a for the regular volume where the information in 610 may be reported in response to the RTPG command for the simulated stretched volume configuration of FIG. 8. In particular, as discussed in more detail below in connection with FIG. 8, the information of 610 may be used and returned in response to issuing the RTPG command directed to the UID for the WWN1=15 for the simulated stretched volume over either of the paths 532a-b simulating paths to the local data storage system. The table 610 includes a row 612 identifying the TPGs of the system 530, a row 614 identifying the target ports of the system 530 and a row 616 identifying the ALUA path states. In particular, the column 610a indicates that the target ports T1 and T2 are included in the TPG1 and have the active optimized path state; and the column 610b indicates that the target ports T3 and T4 are included in the TPG2 and have the active non optimized path state.

The table 620 illustrates in more detail information that may be included in the record 602b for the shadow volume where the information in 620 may be reported in response to the RTPG command for the simulated stretched volume configuration of FIG. 8. In particular, as discussed in more detail below in connection with FIG. 8, the information of 620 may be used and returned in response to issuing the RTPG command directed to the UID for the WWN1=15 for the simulated stretched volume over either of the paths 534a-b simulating the paths to the remote data storage system. The table 620 includes a row 622 identifying the TPGs of the system 530, a row 624 identifying the target ports of the system 530 and a row 626 identifying the ALUA path states. In particular, the column 620a indicates that the target ports T1 and T2 are included in the TPG1 and have the active optimized path state; and the column 620b indicates that the target ports T3 and T4 are included in the TPG2 and have the active non optimized path state.

Referring back to FIG. 8, assume a first RTPG command with UID for the WWN1=15 for the simulated stretched volume is issued over the path 532a from the host 540 to the system 530. In this case, the target port of the path 532a is T1 510a that is included in the TPG1 510 associated with simulating paths to the local data storage system. The management command, RTPG, reads or queries information about the requested volume. Since the first RTPG command is received at T1, the RTPG command is processed 504a by the regular volume object V1 541 where the RTPG command is then serviced by querying 504b the MGT DB 516 for the requested information from the record 602a of volume MD for the UID WWN1=15. The requested information is then returned along the return path 504b, 541, 504a 532a to the host 540. The requested information returned in response to the first RTPG command may be the information in the table 610.

Assume a second RTPG command with UID for the WWN1=15 for the simulated stretched volume is issued over the path 534a from the host 540 to the system 530. In this case, the target port of the path 534a is T3 512a that is included in the TPG2 512 associated with simulating paths to the remote data storage system. The management command, RTPG, reads or queries information about the requested volume. Since the second RTPG command is received at T3, processing of the command flows (504e) from the TPG2 512 to the UID switch 520 that maps the UID of the regular volume, WWN1=15, to the UID of the shadow volume, WWN2=16. In this manner, the second RPTG command is processed 504f by the shadow volume object V2 542, where the RTPG command is then serviced by querying 504g the MGT DB 516 for the requested information from the record 602b of volume MD for the UID WWN2=16. The requested information is then returned along the return path 504g, 542, 504f, 520, 504e, and 534a to the host 540. The requested information returned in response to the second RTPG command may be the information in the table 620.

In connection with the above examples of FIG. 8, the simulated stretched volume may be presented to the host 540 as having a UID or WWN1=15 of the regular volume 541. Thus, the host may issue both management commands and I/O commands over the paths 532a-b, 534a-b directed to the stretched volume with the WWN of 15. If the host 540 issues requests or commands directed to the volume with the WWN=15 over paths to the target ports of TPG1 510, then the system 530 treats the commands or requests as if issued to the local data storage system and the regular volume V1. Otherwise, if the host issues requests or commands to directed to the volume with the WWN=15 over paths to the target ports of TPG2 512, then the system 530 treats the commands or requests as if issued to the remote data storage system and the shadow volume V2. In simulation mode, the system 530 provides for mapping the regular volume's WWN=15 to the shadow volume's WWN=16 when the commands or requests are received at a target port of the TPG2 512. In particular, the UID switch 520 provides for mapping or substituting the received WWN of 15 for the regular volume with the WWN=16 of the shadow volume.

Figure 9B:
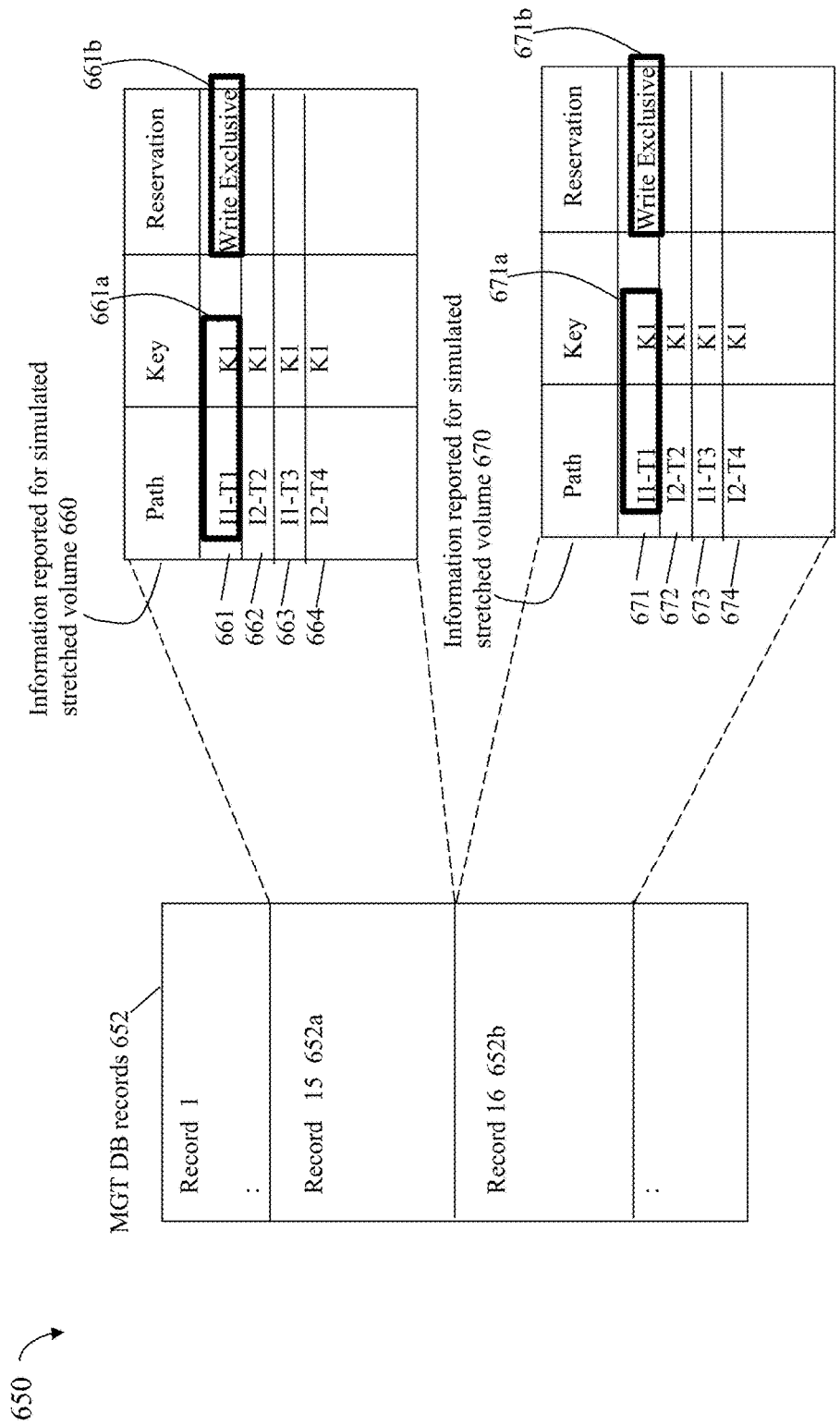

As another example, consider a management command that modifies or updates the volume MD information of the simulated stretched volume in the configuration of FIG. 8. For example, assume that the host 540 registers its key K1 by issuing 4 reservation commands to the system 530 over all 4 paths 532a-b and 534a-b. Assume that there are no registrations or reservations prior to issuing the 4 foregoing 4 reservation commands. Reference is made to FIG. 9B illustrating the MGT DB records 652 of the MGT DB 516. The MGT DB records 652 include a first entry or record of MD 652a for the regular volume V1 that is indexed by the WWN1=15 identifying the regular volume, and a second entry or record of MD 652b for the shadow volume V2 that is indexed by the WWN2=16 identifying the shadow volume. At the start of this example, assume that the records 652a-b do not include the information denoted by the tables 660-670.

Subsequently, a first point in time T1, the host 540 may issue a first registration command, REG1, to register its key K1 on the path 532a for the stretched volume with the UID WWN1=15. In this case, the target port of the path 532a is T1 510a that is included in the TPG1 510 associated with simulating paths to the local data storage system. The management command, REG1, modifies information about the requested volume. Since the REG1 command is received at T1, the REG1 command is processed 504a by the regular volume object V1 541 where the REG1 command is then serviced by updating 504b the record 652a (FIG. 9B) of volume MD for the UID WWN1=15. In particular, the table 660 of FIG. 9B may be updated to register the path I1-T1 with the key K1 as denoted by the element 661a of the row 661.

Additionally, processing may be performed to simulate synchronizing the volume MD for remote counterpart of the stretched volume on the remote data storage system. In particular, processing may be performed to simulate replicating the REG1 command with respect to the shadow volume on the remote data storage system. As noted above, in simulation mode the connection used to configured as a loopback connection from the system 530 to itself (e.g., the source and destination of the connection are both the same system 530). The management command to synchronize or update the remote copy of the volume MD is issued (504c) to the local to remote connection client 524 over the connection 530 to the local to remote connection server 526, where both 524 and 526 are in the same system 530. The command REG1 currently specifies the UID WWN1=15 of the normal volume 541. As denoted by the processing arrow 504j, processing proceeds from the connection server 526 to the UID switch 522, where the UID of the command REG1 is mapped from the WWN1=15 of the regular volume to the UID WWN2=16 of the shadow volume. As denoted by the processing arrow 504h, control proceeds from the UID switch 522 where the REG1 command with the converted UID WWN2=16 is processed using the shadow volume object 542. As denoted by the processing arrow 504g, the WWN2=16 of the shadow volume is used as an index to identify the record 652b to be updated to include the registration information 6711 of the row 671 of the table 670. Processing of the management path then provides for returning along the return path 504g, 542, 504h, 522, 504j, 526, 530, 524, 504c, 541, 504a, and 532a to the host 540.

In a manner similar to that as described above for processing the first registration command REG1, processing may also be performed at a second subsequent point in time T2 to process a second registration command, REG2, issued by the host 540 to register its key K1 on the path 532b for the stretched volume with the UID WWN1=15. As a result of servicing the management command REG2, the registration information in the row 662 of the table 660 of FIG. 9B may be populated, and the registration information in the row 672 of the table 670 of FIG. 9B may be populated.

At a third point in time T3 subsequent to T2, the host 540 may issue a third registration command, REG3, to register its key K1 on the path 534a for the stretched volume with the UID WWN1=15. In this case, the target port of the path 534a is T3 512a that is included in the TPG2 512 associated with simulating paths to the remote data storage system. The management command, REG3, modifies information about the requested volume. Since the REG3 command is received at T3, command processing flows 504e to the UID switch 520 that maps the WWN1=15 of the regular volume to the WWN2=16 of the shadow volume. As denoted by the processing arrow 504f, processing flows from the UID switch 520 to the shadow volume object 542 where the REG3 command is then serviced by updating 504g the record 652b (FIG. 9B) of volume MD for the UID WWN1=15. In particular, the table 670 of FIG. 9B may be updated to register the path I1-T3 with the key K1 as denoted by the row 673.

Additionally, processing may be performed to simulate synchronizing the volume MD for regular volume on the local data storage system. In particular, processing may be performed to simulate replicating the REG3 command with respect to the regular volume on the local data storage system. Data flow associated with this volume MD synchronization processing is represented by proceeding (504h) from the shadow volume object 542 to the UID switch 522, where the UID WWN2=16 is mapped by the UID switch 522 to the UID WWN1=15 of the regular volume. From the switch 522, the REG3 command with the UID WWN1=15 of the regular volume is transmitted (504*i*) to the local to remote connection client 524, over the connection 530, to the local to remote connection server 526, and then processed (504*d*) by the regular volume object 541.

As noted above, in simulation mode the connection used to configured as a loopback connection from the system 530 to itself (e.g., the source and destination of the connection are both the same system 530). The management command to synchronize or update the copy of the volume MD associated with the regular volume is issued (504*i*) to the local to remote connection client 524 over the connection 530 to the local to remote connection server 526, where both 524 and 526 are in the same system 530. The command REG3 currently specifies the UID WWN1=15 of the normal volume 541. As denoted by the processing arrow 504*d*, processing proceeds from the connection server 526 to the regular volume object 541. As denoted by the processing arrow 504*b*, the WWN1=15 of the regular volume is used as an index to identify the record 652*a* to be updated to include the registration information of the row 663 of the table 660. Processing of the management path then provides for returning along the return path 504*b*, 541, 504*d*, 530, 524, 504*i*, 522, 504*h*, 542, 504*f*, 520, 504*e* and 534*a* to the host 540.

In a manner similar to that as described above for processing the third registration command REG3, processing may also be performed at a fourth subsequent point in time T4 to process a fourth registration command, REG4, issued by the host 540 to register its key K1 on the path 534*b* for the stretched volume with the UID WWN1=15. As a result of servicing the management command REG4, the registration information in the row 674 of the table 670 of FIG. 9B may be populated, and as a result of simulating volume MD synchronization over the connection 530, the registration information in the row 664 of the table 660 of FIG. 9B may be populated.

Assume now at a fifth point in time T5 subsequent to T4, a reservation command RES1 is issued by the host 540 over the path 532*a* for the stretched volume with the UID WWN1=15. The command RES1 may, for example, request write exclusive access for the initiator I1, whereby only the initiator I1 holding the current reservation is allowed to issue writes but other initiators may issue read I/Os. The RES1 command may be serviced using a processing flow similar to that discussed above, for example, in connection with processing the first registration command REG1 with respect to processing flow described in connection with FIG. 8. As a result of servicing the RES1 command, a reservation is made as denoted by the element 661*b* of the table 660 and the element 671*b* of the table 670.

As illustrated by the volume MD in FIG. 9B, after synchronization of the volume MD of the regular volume and the shadow volume, both entries 652*a-b* contain the same information but for different UIDs or WWNs for the two volumes.

At a sixth point in time T6 subsequent to T5, assume the host 540 issues a management command directed to the WWN1=15 of the simulated stretched volume to read existing reservation and registration information, where command may be sent over any of the path 532*a-b*, 534*a-b* over which stretched volume is exposed. Consistent with discussion above regarding the RTPG command, if the management command to read existing registrations and reservations is sent over any of the paths 532*a-b*, the volume MD 660 for regular volume is to returned to the host (e.g., data processing flow with reference to FIG. 8 is 532*a* or 532*b*, 510, 504*a*, 541 and 504*b* to obtain the requested information from the MGT DB 516; a return path processing flow that is the reverse traversal of the foregoing data processing flow). Consistent with discussion above regarding the RTPG command, if the management command to read existing registrations and reservations is sent over any of the paths 534*a-b*, the volume MD 670 for shadow volume is returned to the host (e.g., data processing flow with reference to FIG. 8 is 534*a* or 534*b*, 512, 504*e*, 520, 504*f*, 542 and 504*g* to obtain the requested information from the MGT DB 516; and a return path processing flow that is the reverse traversal of the foregoing data processing flow). Additionally, the information returned in response to the RTPG command directed to the simulated stretch volume is the same independent of the particular path (exposing the stretched volume) that is used to send the RTPG to the system 530.

In at least one embodiment with reference to FIG. 8, all I/O commands, such as read and write I/O commands, may be processed by the normal volume 541 independent of which target port receives the I/O command. To illustrate, I/Os sent over the paths 532*a-b* are received at the TPG 510. As denoted by the arrow 502*a*, the I/Os are sent from the TPG 510 to the regular volume 541 and then serviced (502*b*) using the data from the BE data storage 514. In connection with the I/O commands, any data may be returned along with an acknowledgement using a return path that is the reverse traversal of the incoming I/O command path just described.

Additionally, I/Os sent over the paths 534*a-b* are received at the TPG 512. As denoted by the arrow 502*c*, the I/Os are sent from the TPG 512 to the regular volume 541 and then serviced (502*b*) using the data from the BE data storage 514. In connection with the I/O commands, any data may be returned along with an acknowledgement using a return path that is the reverse traversal of the incoming I/O command path just described.

As described above such as in connection with FIG. 9B, the techniques herein provide for simulating MD synchronization via the two MD records or entries for the regular volume and its shadow volume. The techniques described above provide for generally simulating a stretched volume and processing of I/O or data paths commands as well as control or management commands directed to a simulated stretched volume.

For testing purposes, testing may include validating the correct MD stored in the entries or records of the MGT DB for the regular volume and its associated shadow volume. The validation regarding the correctness of the synchronized MD entries for the volume and its associated shadow volume may be performed using any suitable technique. For example, management commands may be issued from the host along the paths 532*a* and 534*a* to respectively read the MD of the two entries, 652*a* and 652*b*, and then compare the information returned to ensure that both commands report the same information. For example, a first command to read registration and reservation information for the stretched volume with the UID of WWN1=15 may be issued to T1 or T2 of the TPG1 510 to return a first set of information; and a second command to read the registration and reservation information for the stretched volume with the UID WWN1=15 may be issued to T3 or T4 of the TPG2 512 to return a second set of information. The first and the second set of information may be compared to ensure that first and second sets of information match whereby both the first and second commands return the same registration and reservation information denoting the consistency and synchronization of the MD entries for the regular volume V1 and shadow volume V2 of the simulated stretched volume.

Another way in which the MD of the two entries for the regular and shadow volumes of the DB may be validated is by reading the two entries, such as 652a-b, directly from the MGT DB on the data storage system and comparing the content of the two entries. The two entries are expected to be identical but for the different WWNs for the regular volume and its shadow volume. If the two entries include the same information other than the different WWNs, then validation is successful.

In at least one embodiment, the connection 530 used for volume MD synchronization and simulating MD synchronization may be a socket-based connection. In at least one embodiment, any message sent may be characterized as being sent from a local client to a remote server. In this context, either the simulated local system or the simulated remote system can be the client or the server depending on which simulated system sends the message over the connection. In at least one embodiment, the connection 530 may be a TCP connection between a client and a server. In simulation mode, the connection has a source IP address of the client and a destination IP address of the server, where the source IP address and the destination IP address are the same, or more generally, both on the same single data storage system. In contrast, in an actual metro configuration (e.g., non-simulation mode) where the TCP connection is used to synchronize MD between a local data storage system and a remote data storage system, the connection has a source IP address of the client and a destination IP address of the server, where the source IP address and the destination IP address are different and respectively denote the IP addresses of the first client data storage system sending the message and the second server data storage system receiving the message.

Figure 7C:
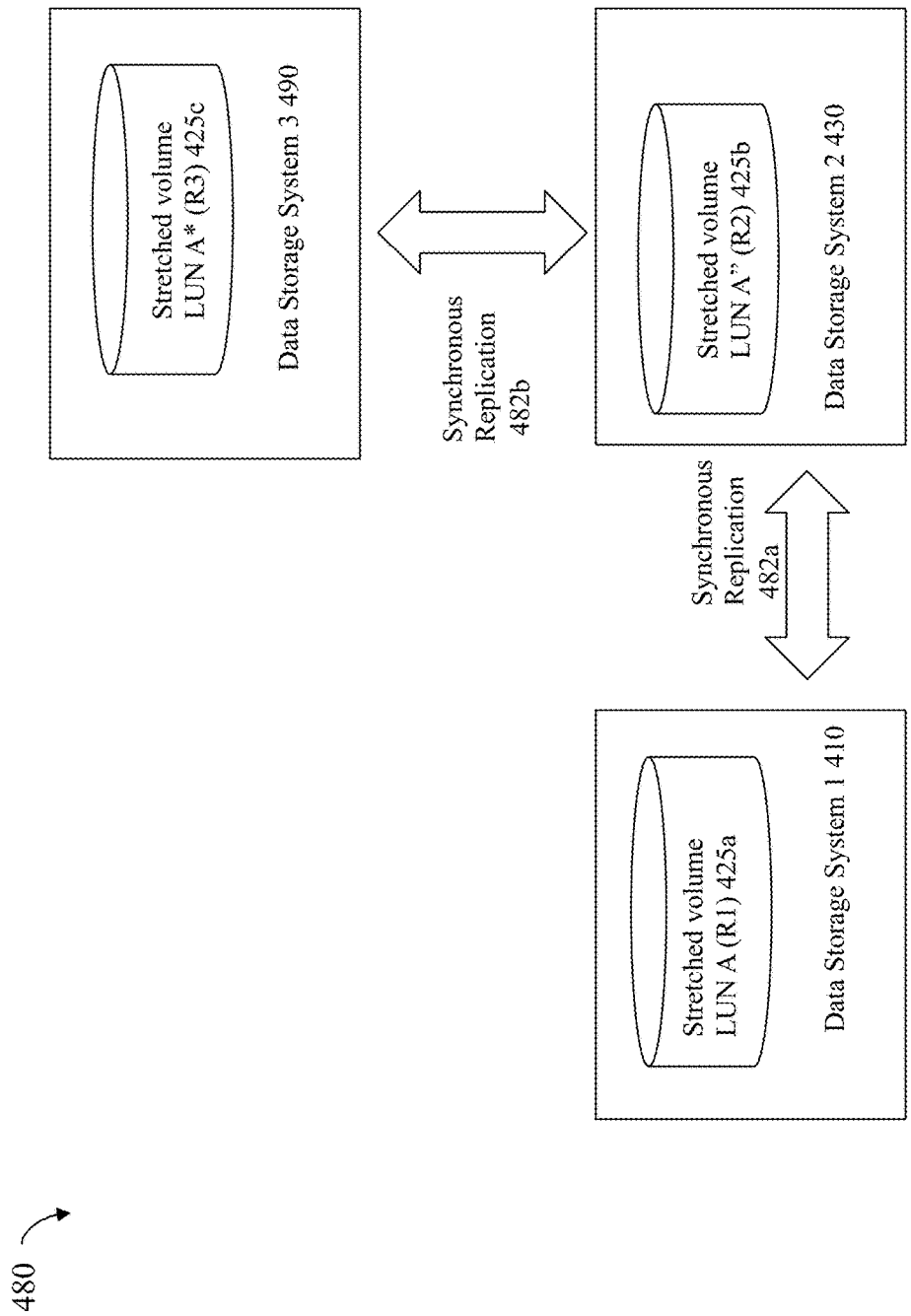
FIG. 7C is an example of a metro cluster configuration include three data storage systems.

The foregoing description provides examples of simulated stretched volume configurations including a regular volume and a single shadow volume. More generally, the techniques described herein may be more generally applied in connection with a simulated stretched volume configuration of M volumes where M is an integer that is two or more. It is straightforward to extend the techniques herein for use with more than two volumes configured as a simulated stretched volume to simulate, for example, a stretched volume configured from 3 volumes as illustrated in FIG. 7C. For example, with 3 volumes included in 3 different data storage systems, the simulated stretched volume configuration includes a regular volume and two shadow volumes configured in the same single data storage system. With 3 volumes, the target ports (or more generally targets) of the single system 530 may be partitioned into 3 groups or sets where a different one of the groups or sets is associated with simulating paths to a different one of the 3 data storage systems. Each of the regular volumes and the 2 shadow volumes is assigned a different LUN ID or UID, such as a different WWN. In this case, UID switches maps UIDs of the shadow volumes to the UID of the regular volume, and also maps the UID of the regular volume to the UIDs of the shadow volume. For example, with reference to FIG. 8, the UID switches 520, 522 map between the UID of the regular volume and the UID of the shadow volume in connection with processing management requests received at the TPG2 512. In a similar manner, additional UID switches may provide for mapping between the UID of the regular volume and the UID of a second shadow volume exposed over a third group of target ports of the system 530.

Figure 10B:
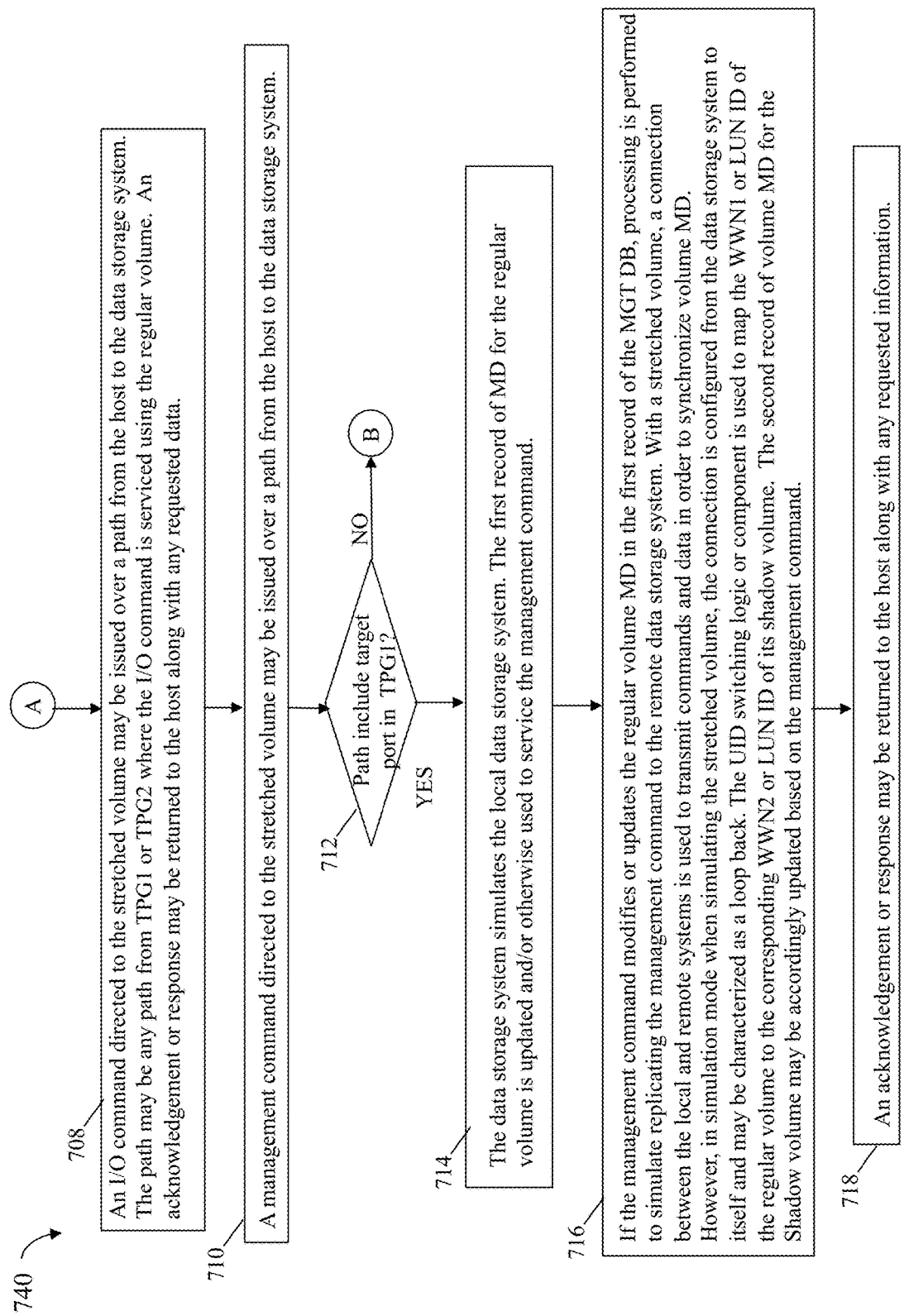

Referring to FIGS. 10A-10C, shown are flowcharts of processing steps that may be performed in an embodiment in accordance with the techniques herein. The flowcharts 700, 740 and 760 summarize processing described above.

At the step 702, a command may be issued to create a volume or LUN that is a simulated stretched volume configured using a volume pair V1, V2. V1 may be a normal or regular volume exposed to the host. V2 may be configured as a shadow volume of V1. V2 may be a simulated remote instance of the stretched volume or LUN. V1 and V2 may be configured to have the same logical unit number but may be configured to each have different LUN IDs such as different WWNs. The regular and shadow volumes are configured in the same single data storage system. From the step 702, control proceeds to the step 704.

At the step 704, processing may be performed to create a first record or entry in the MGT DB for V1 and a separate second record or entry in the MGT DB for V2. The first and second records may contain the same information other than different LUN IDs, such as different WWNs, uniquely used to identify different volume or LUN instances of the regular and shadow volumes. The first record represents the stretched volume MD on the local data storage system for V1, and the second record represents the stretched volume MD on the remote data storage system for V2. A regular or normal volume object represents V1 and the first record denoting, respectively, the stretched volume and its MD when the data storage system simulates the role of the local data storage system. A shadow volume object represents V2 and the second record denoting, respectively, the remote counterpart of the stretched volume and its MD when the data storage system simulates the role of the remote data storage system. The LUN ID, such as the WWN, of V2 may be configured based on specified rules of a defined conversion or mapping process that maps a first WWN1 of V1 to a second WWN2 of V2. In a similar manner, WWN1 of V1 may be determined from WWN2 of V2 based on specified rules of a defined conversion or mapping process that maps the second WWN2 of V2 to the first WWN1 of V1. From the step 704, control proceeds to the step 706.

At the step 706, data storage system targets, such as target ports, over which the stretched volume is exposed are partitioned into two groups. The two groups may be non-overlapping having no intersection or common target ports in both groups. A first group 1 of the target ports, TPG1, may be associated with simulating the local data storage system and paths between the host and the local data storage system. If the host issues a management command to a target port in TPG1, the command is considered as a command to the local data storage system and is processed using the normal volume object. A second group 2 of the target ports, TPG2, may be associated with simulating the remote data storage system and paths between the host and the remote data storage system. If the host issues a management command to a target port in TPG2, the command is considered as a command to the remote data storage system and is processed using the shadow volume object. From the step 706, control proceeds to the step 708.

At the step 708, an I/O command directed to the stretched volume may be issued over a path from the host to the data storage system. The path may be any path from the TPG1 or the TPG2, where the I/O command is serviced using the regular volume. An acknowledgement or response may be returned to the host along with any requested data. The I/O command may be directed to the UUID, such as the WWN, of the regular volume. From the step 708, control proceeds to the step 710.

At the step 710, a management command directed to the stretched volume may be issued over a path from the host to the data storage system. The management command may identify the stretched volume using the WWN1 or other UID of the regular volume. From the step 710, control proceeds to the step 712.

At the step 712, a determination is made as to whether the path over which the management command was sent is included in the TPG. If the step 712 evaluates to yes, control proceeds to the step 714.

At the step 714, data storage system simulates the local data storage system. The first record of MD for the regular volume is updated and/or otherwise used to service the management command. From the step 714, control proceeds to the step 716.

At the step 716, if the management command modifies or updates the regular volume MD in the first record of the MGT DB, processing is performed to simulate replicating the management command to the remote data storage system. With a stretched volume, a connection between the local and remote systems is used to transmit commands and data in order to synchronize volume MD. However, in simulation mode when simulating the stretched volume, the connection is configured from the single data storage system to itself and may be characterized as a loop back. The UID switching logic or component is used to map the WWN1 or LUN ID of the regular volume to the corresponding WWN2 or LUN ID of its shadow volume. The second record of volume MD for the shadow volume may be accordingly updated based on the management command. From the step 716, control proceeds to the step 718.

At the step 718, acknowledgement or response may be returned to the host along with any requested information.

If the step 712 evaluates to no, the path is to a target port in the TPG2 and control proceeds to the step 720. At the step 720, the single data storage system in which the regular and shadow volumes are configured simulates the remote data storage system. A UID switching logic or component is used to map the WWN1 or LUN ID of the regular volume to a corresponding WWN2 or LUN ID of its shadow volume. The second record of MD for the shadow volume is updated or otherwise used to service the management command. From the step 720, control proceeds to the step 722.

At the step 722, if the management command modifies or updates the shadow volume MD in the MGT DB, processing is performed to simulate replicating the management command to the local data storage system. With a stretched volume, a connection between the local and remote systems is used to transmit commands and data in order to synchronize volume MD. However, in simulation mode when simulating the stretched volume, the connection is configured from the data storage system to itself and may be characterized as a loop back. The UID switching logic or component is used to map the WWN2 or LUN ID of the shadow volume to the corresponding WWN1 or LUN ID of its regular volume. The first record of volume MD for the regular volume may be accordingly updated based on the management command. From the step 722, control proceeds to the step 724

At the step 724, an acknowledgement or response may be returned to the host along with any requested information.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing management commands comprising:
creating a simulated stretched volume in a single data storage system, wherein the simulated stretched volume simulates a stretched volume configured from two or more volumes in two or more data storage systems with the two or more volumes exposed to a host as a same volume having a same first unique identifier over two or more paths from the two or more data storage systems, wherein the simulated stretched volume is configured from a plurality of volumes of the single data storage system and the plurality of volumes are assigned a plurality of unique identifiers associated with the simulated stretched volume, and wherein the plurality of volumes configured as the simulated stretched volume are exposed to the host over a plurality of paths from the single data storage system as the same volume having the same first unique identifier, wherein the single data storage system includes sets of target ports, wherein each of the sets of target ports simulates paths to a different one of the two or more data storage systems;
receiving, on a first path of the plurality of paths, a first management command directed to the simulated stretched volume configured as the same volume having the first unique identifier, wherein the first path is from an initiator of the host to a first target port of the single data storage system, wherein the first target port is included in a first set of the plurality of sets of target ports and the first set of target ports simulates paths to a first data storage system of the two or more data storage systems; and
performing first processing to service the first management command, wherein the first processing includes the single data storage system simulating the first data storage system servicing the first management command.

2. The method of claim 1, wherein the single data storage system includes a management database with a plurality of metadata records for the plurality of volumes, wherein each of the plurality of volumes is described by metadata of a different one of the plurality of metadata records, and wherein each of the plurality of metadata records associated with a particular one of the plurality of volumes includes a same set of metadata describing the simulated stretched volume and includes one of the plurality of unique identifiers associated with the particular one of the plurality of volumes.

3. The method of claim 2, wherein a first volume of the plurality of volumes in the single data storage system represents and simulates a particular one of the two or more volumes, wherein the particular one volume is included in the first data storage system, and wherein the first processing includes servicing the first management command using one of the plurality of metadata records associated with the first volume.

4. The method of claim 3, wherein a second set of target ports is included in the plurality of sets of target ports of the single data storage system, wherein the second set of target ports simulates paths to a second data storage system of the two or more data storage systems, and wherein a second volume of the plurality of volumes in the single data storage system represents and simulates another one of the two or more volumes, wherein the another one volume is included in the second data storage system.

5. The method of claim 4, wherein the first volume is a regular volume configured in the single data storage system with the first unique identifier, wherein the second volume is a shadow volume of the regular volume, and wherein the shadow volume is configured with a second unique identifier of the plurality of unique identifiers.

6. The method of claim 5, wherein the first processing includes:
using the first unique identifier to access a first set of metadata of a first of the plurality of metadata records associated with the regular volume.

7. The method of claim 6, wherein servicing the first management command includes:
reading the first set of metadata associated with the first unique identifier; and
returning a portion of the first set of metadata in accordance with the first management command.

8. The method of claim 6, wherein servicing the first management command includes:
updating, in accordance with the first management command, the first set of metadata of the first metadata record associated with the first unique identifier and the regular volume; and
simulating replicating the first management command over a connection to the second data storage system.

9. The method of claim 8, wherein the connection is configured for a simulation mode that simulates the stretched volume and wherein the connection is configured from the single data system to the single data storage system.

10. The method of claim 9, wherein said simulating replicating the first management command over the connection to second data storage system includes:
transmitting the first management command over the connection configured for the simulation mode;
mapping the first unique identifier to the second unique identifier; and
updating, in accordance with the first management command, a second set of metadata of a second of the plurality of metadata records associated with the second unique identifier and the shadow volume.

11. The method of claim 10, further comprising:
receiving, over a second path of the plurality of paths, a second management command directed to the simulated stretched volume configured as the same volume having the first unique identifier, wherein the second path is from an initiator of the host to a second target port of the single data storage system, wherein the second target port is included in the second set of the plurality of sets of target ports that simulates paths to the second data storage system; and
performing second processing to service the second management command, wherein the second processing includes the single data storage system simulating the second data storage system servicing the second management command.

12. The method of claim 11, wherein the second processing includes:
mapping the first unique identifier associated with the simulated stretched volume to the second unique identifier associated with the simulated stretched volume; and
using the second unique identifier to access the second set of metadata of the second metadata record associated with the shadow volume.

13. The method of claim 12, wherein servicing the second management command includes:
reading the second set of metadata of the second metadata record associated with the second identifier and the shadow volume; and
returning a portion of the second set of metadata in accordance with the second management command.

14. The method of claim 12, wherein servicing the second management command includes:
updating, in accordance with the second management command, the second set of metadata of the second metadata record associated with the second identifier and the shadow volume; and
simulating replicating the second management command over the connection to the first data storage system.

15. The method of claim 14, wherein said simulating replicating the second management command over the connection to the first data storage system includes:
mapping the second unique identifier to the first unique identifier;
transmitting the second management command over the connection configured for the simulation mode, wherein the second management command is directed to the regular volume having the first unique identifier; and
updating, in accordance with the second management command, the first set of metadata of the first metadata record associated with the first unique identifier and the regular volume.

16. The method of claim 11, further comprising:
receiving a first I/O command on the first path from the host to the single data storage system, wherein the first I/O command is directed to the simulated stretched volume configured as the same volume having the first unique identifier; and
servicing the first I/O command using the regular volume.

17. The method of claim 16, further comprising:
receiving a second I/O command on the second path from the host to the single data storage system, wherein the I/O command is directed to the simulated stretched volume configured as the same volume having the first unique identifier; and
servicing the second I/O command using the regular volume.

18. A system comprising:
one or more processors; and
one or more memories comprising code stored thereon that, when executed, performs a method of processing management commands comprising:
creating a simulated stretched volume in a single data storage system, wherein the simulated stretched volume simulates a stretched volume configured from two or more volumes in two or more data storage systems with the two or more volumes exposed to a host as a same volume having a same first unique identifier over two or more paths from the two or more data storage systems, wherein the simulated stretched volume is configured from a plurality of volumes of the single data storage system and the plurality of volumes are assigned a plurality of unique identifiers associated with the simulated stretched volume, and wherein the plurality of volumes configured as the simulated stretched volume are exposed to the host over a plurality of paths from the single data storage system as the same volume having the same first unique identifier, wherein the single data storage system includes sets of target ports, wherein each of the sets of target ports simulates paths to a different one of the two or more data storage systems;

receiving, on a first path of the plurality of paths, a first management command directed to the simulated stretched volume configured as the same volume having the first unique identifier, wherein the first path is from an initiator of the host to a first target port of the single data storage system, wherein the first target port is included in a first set of the plurality of sets of target ports and the first set of target ports simulates paths to a first data storage system of the two or more data storage systems; and performing first processing to service the first management command, wherein the first processing includes the single data storage system simulating the first data storage system servicing the first management command.

19. A non-transitory computer readable medium comprising code stored thereon that, when executed, performs a method of processing management commands comprising:

creating a simulated stretched volume in a single data storage system, wherein the simulated stretched volume simulates a stretched volume configured from two or more volumes in two or more data storage systems with the two or more volumes exposed to a host as a same volume having a same first unique identifier over two or more paths from the two or more data storage systems, wherein the simulated stretched volume is configured from a plurality of volumes of the single data storage system and the plurality of volumes are assigned a plurality of unique identifiers associated with the simulated stretched volume, and wherein the plurality of volumes configured as the simulated stretched volume are exposed to the host over a plurality of paths from the single data storage system as the same volume having the same first unique identifier, wherein the single data storage system includes sets of target ports, wherein each of the sets of target ports simulates paths to a different one of the two or more data storage systems;

receiving, on a first path of the plurality of paths, a first management command directed to the simulated stretched volume configured as the same volume having the first unique identifier, wherein the first path is from an initiator of the host to a first target port of the single data storage system, wherein the first target port is included in a first set of the plurality of sets of target ports and the first set of target ports simulates paths to a first data storage system of the two or more data storage systems; and performing first processing to service the first management command, wherein the first processing includes the single data storage system simulating the first data storage system servicing the first management command.

* * * * *